US011460383B2

United States Patent
Rozhok et al.

(10) Patent No.: US 11,460,383 B2
(45) Date of Patent: Oct. 4, 2022

(54) AUTOMATED STAINING SYSTEM

(71) Applicants: NanoCytomics, LLC, Evanston, IL (US); NORTHWESTERN UNIVERSITY, Evanston, IL (US)

(72) Inventors: Sergey Rozhok, Evanston, IL (US); Justin R. Derbas, Evanston, IL (US); Jarema Czarnecki, Evanston, IL (US); Hariharan Subramanian, Evanston, IL (US)

(73) Assignees: NanoCytomics, LLC, Evanston, IL (US); Northwestern University, Evanston, IL (US)

( * ) Notice: Subject to any disclaimer, the term of this patent is extended or adjusted under 35 U.S.C. 154(b) by 498 days.

(21) Appl. No.: 16/310,130

(22) PCT Filed: Jun. 16, 2017

(86) PCT No.: PCT/US2017/037857
§ 371 (c)(1),
(2) Date: Dec. 14, 2018

(87) PCT Pub. No.: WO2017/218882
PCT Pub. Date: Dec. 21, 2017

(65) Prior Publication Data
US 2019/0212234 A1   Jul. 11, 2019

Related U.S. Application Data

(60) Provisional application No. 62/351,166, filed on Jun. 16, 2016.

(51) Int. Cl.
*G01N 1/31* (2006.01)
*G01N 1/30* (2006.01)
(Continued)

(52) U.S. Cl.
CPC .............. *G01N 1/312* (2013.01); *B05C 3/02* (2013.01); *B05C 3/08* (2013.01); *G01N 1/28* (2013.01); *G01N 1/30* (2013.01)

(58) Field of Classification Search
CPC  G01N 1/312; G01N 1/30; G01N 1/28; G01N 33/50; G01N 1/31; G01N 35/1002;
(Continued)

(56) References Cited

U.S. PATENT DOCUMENTS 3,854,440 A    12/1974   Astle
4,092,952 A    6/1978    Wilkie et al.
(Continued)

FOREIGN PATENT DOCUMENTS

EP    0381308    8/1990
EP    0508568    10/1992
(Continued)

OTHER PUBLICATIONS

International Search Report and Written Opinion dated Sep. 13, 2017 for International Application No. PCT/US2017/037857.

*Primary Examiner* — Samuel P Siefke
*Assistant Examiner* — Tingchen Shi
(74) *Attorney, Agent, or Firm* — Perkins Coie LLP

(57) ABSTRACT

Automated cell staining systems and methods are disclosed herein. In particular, the staining systems disclosed herein provide low-volume, automated bench top staining systems for staining biological samples contained on a cytological slide.

17 Claims, 13 Drawing Sheets

(51) Int. Cl.
*B05C 3/02* (2006.01)
*B05C 3/08* (2006.01)
*G01N 1/28* (2006.01)

(58) Field of Classification Search
CPC ........ G01N 35/1016; G01N 2035/0443; B05C
3/02; B05C 3/08; B05C 3/005; B05C
3/05; H01J 37/20; G02B 21/34; F04B
53/107; F04B 43/08; F04B 23/025; F16K
15/144; B67D 7/0216; B01L 3/0293;
B05B 11/007; B05B 11/0072; B05B
11/3032; B05B 11/3067
See application file for complete search history.

(56) References Cited

U.S. PATENT DOCUMENTS

| | | | |
|---|---|---|---|
| 4,172,381 A * | 10/1979 | Aigner | G01F 1/065 73/861.87 |
| 4,847,208 A | 7/1989 | Bogen | |
| 5,059,393 A | 10/1991 | Quenin et al. | |
| 5,273,905 A | 12/1993 | Muller et al. | |
| 5,695,942 A | 12/1997 | Farmilo et al. | |
| 5,700,346 A | 12/1997 | Edwards | |
| 5,932,872 A | 8/1999 | Price | |
| 5,947,167 A | 9/1999 | Bogen et al. | |
| 5,958,760 A * | 9/1999 | Freeman | G01N 1/312 435/286.5 |
| 6,180,061 B1 | 1/2001 | Bogen et al. | |
| 6,296,809 B1 | 10/2001 | Richards et al. | |
| 6,395,536 B2 | 5/2002 | Freeman | |
| 6,534,008 B1 | 3/2003 | Angros | |
| 6,582,962 B1 | 6/2003 | Richards et al. | |
| 6,855,292 B2 | 2/2005 | Angros | |
| 6,918,309 B2 | 7/2005 | Brock et al. | |
| 7,101,511 B2 | 9/2006 | Toi et al. | |
| 7,217,392 B2 | 5/2007 | Bogen et al. | |
| 7,250,301 B2 | 7/2007 | Angros | |
| 7,270,785 B1 | 9/2007 | Lemmen et al. | |
| 7,396,508 B1 | 7/2008 | Richards et al. | |
| 7,404,927 B2 | 7/2008 | Lemmen et al. | |
| 7,410,753 B2 | 8/2008 | Hopkins et al. | |
| 7,468,161 B2 | 12/2008 | Reinhardt et al. | |
| 7,476,362 B2 | 1/2009 | Angros | |
| 7,501,283 B2 | 3/2009 | Hersch et al. | |
| 7,578,206 B2 | 8/2009 | Brock et al. | |
| 7,622,077 B2 | 11/2009 | Angros | |
| 7,632,461 B2 | 12/2009 | Angros | |
| 7,648,678 B2 | 1/2010 | Favuzzi et al. | |
| 7,687,243 B1 | 3/2010 | Crook | |
| 7,718,435 B1 | 5/2010 | Bogen et al. | |
| 7,767,152 B2 | 8/2010 | Stead et al. | |
| 7,823,469 B2 | 11/2010 | Takaya et al. | |
| 7,823,535 B2 | 11/2010 | Hanafusa et al. | |
| 7,875,242 B2 | 1/2011 | Shah | |
| 7,897,106 B2 * | 3/2011 | Angros | G01N 1/312 422/64 |
| 7,901,634 B2 | 3/2011 | Testa et al. | |
| 7,951,612 B2 | 5/2011 | Angros et al. | |
| 8,007,720 B2 | 8/2011 | Angros | |
| 8,007,721 B2 | 8/2011 | Angros | |
| 8,048,373 B2 | 11/2011 | Reinhardt et al. | |
| 8,052,927 B2 | 11/2011 | Angros | |
| 8,071,023 B2 | 12/2011 | Angros | |
| 8,092,742 B2 | 1/2012 | Angros | |
| 8,211,385 B2 | 7/2012 | Testa et al. | |
| 8,216,512 B2 | 7/2012 | Winther et al. | |
| 8,313,694 B2 | 11/2012 | Angros | |
| 8,329,100 B2 | 12/2012 | Angros | |
| 8,354,058 B2 | 1/2013 | Angros | |
| 8,361,388 B2 | 1/2013 | Angros et al. | |
| 8,377,377 B2 | 2/2013 | Angros | |
| 8,486,335 B2 | 7/2013 | Angros | |
| 8,529,836 B2 | 9/2013 | Winther et al. | |
| 8,541,244 B2 | 9/2013 | Angros et al. | |
| 8,574,494 B2 | 11/2013 | Angros | |
| 8,585,985 B2 | 11/2013 | Lihl et al. | |
| 8,632,739 B2 | 1/2014 | Testa et al. | |
| 8,696,988 B2 | 4/2014 | Angros | |
| 8,758,707 B2 | 6/2014 | Watkins et al. | |
| 8,784,735 B2 | 7/2014 | Winther et al. | |
| 8,877,144 B2 | 11/2014 | Poulsen et al. | |
| 8,932,543 B2 | 1/2015 | Bui et al. | |
| 8,968,675 B2 | 3/2015 | Kalra | |
| 9,068,955 B2 | 6/2015 | Voss et al. | |
| 9,091,620 B2 | 7/2015 | Yi | |
| 9,133,507 B2 | 9/2015 | Testa et al. | |
| 9,176,033 B2 | 11/2015 | Angros | |
| 9,182,323 B2 | 11/2015 | Poulsent et al. | |
| 9,261,524 B2 | 2/2016 | Von Beichmann et al. | |
| 9,267,868 B2 | 2/2016 | Angros | |
| 9,269,138 B2 | 2/2016 | Zahniser et al. | |
| 9,354,145 B2 | 5/2016 | Angros et al. | |
| 9,435,723 B2 | 9/2016 | Angros | |
| 9,464,974 B2 | 10/2016 | Angros | |
| 9,528,918 B2 | 12/2016 | Reinhardt et al. | |
| 9,528,919 B2 | 12/2016 | Fox et al. | |
| 9,606,034 B2 | 3/2017 | Angros | |
| 9,719,895 B2 | 8/2017 | Angros et al. | |
| 9,766,165 B2 | 9/2017 | Angros | |
| 9,772,266 B2 | 9/2017 | Angros | |
| 9,778,273 B2 | 10/2017 | Feingold et al. | |
| 9,778,276 B2 | 10/2017 | Farr et al. | |
| 9,784,652 B2 | 10/2017 | Zahniser et al. | |
| 2003/0211630 A1 | 11/2003 | Richards et al. | |
| 2004/0191128 A1* | 9/2004 | Bogen | B67D 7/0216 422/400 |
| 2005/0019223 A1 | 1/2005 | Platt et al. | |
| 2005/0042767 A1* | 2/2005 | Machida | G01N 1/312 436/174 |
| 2006/0040341 A1 | 2/2006 | Bland et al. | |
| 2006/0166371 A1 | 7/2006 | Testa et al. | |
| 2006/0281116 A1 | 12/2006 | Angros et al. | |
| 2006/0281143 A1 | 12/2006 | Liu et al. | |
| 2007/0231889 A1 | 10/2007 | Angros | |
| 2008/0145891 A1* | 6/2008 | Burton | G01N 1/312 435/40.51 |
| 2009/0124519 A1 | 5/2009 | Platt et al. | |
| 2010/0092683 A1 | 4/2010 | Ermantraut et al. | |
| 2011/0091962 A1* | 4/2011 | Carsillo | G01N 1/312 435/286.5 |
| 2013/0295597 A1 | 11/2013 | DeWitte et al. | |
| 2014/0055853 A1 | 2/2014 | Corwin et al. | |
| 2015/0111202 A1 | 4/2015 | Bui et al. | |
| 2015/0260618 A1 | 9/2015 | Kalra | |
| 2015/0300929 A1 | 10/2015 | Kirk et al. | |
| 2015/0316454 A1* | 11/2015 | Wimberger-Friedl | B01L 3/502715 435/309.1 |
| 2016/0033372 A1 | 2/2016 | Poulsen et al. | |
| 2016/0076978 A1 | 3/2016 | Dave et al. | |
| 2016/0282376 A1 | 9/2016 | Keller et al. | |
| 2016/0291045 A1 | 10/2016 | Czarnecki et al. | |
| 2016/0370264 A1* | 12/2016 | Campbell | G01N 1/2813 |
| 2016/0370390 A1 | 12/2016 | Angros | |
| 2017/0023449 A1 | 1/2017 | Angros | |
| 2017/0059457 A1 | 3/2017 | Fox et al. | |
| 2017/0082585 A1 | 3/2017 | DeWitte et al. | |
| 2017/0254731 A1 | 9/2017 | Ohmae et al. | |

FOREIGN PATENT DOCUMENTS

| | | |
|---|---|---|
| EP | 1073892 | 2/2001 |
| EP | 1208378 | 5/2002 |
| EP | 1007937 | 10/2003 |
| EP | 1573312 | 7/2004 |
| EP | 1453600 | 9/2004 |
| EP | 1548448 | 6/2005 |
| EP | 1600759 | 11/2005 |
| EP | 1711590 | 10/2006 |
| EP | 1869159 | 10/2006 |
| EP | 1717571 | 11/2006 |
| EP | 1888739 | 11/2006 |

(56) References Cited

FOREIGN PATENT DOCUMENTS

| EP | 1358012 | 8/2008 |
|---|---|---|
| EP | 2425227 | 11/2010 |
| EP | 2275810 | 1/2011 |
| EP | 2278297 | 1/2011 |
| EP | 1939631 | 4/2011 |
| EP | 2053378 | 4/2011 |
| EP | 2489434 | 8/2012 |
| EP | 2492014 | 8/2012 |
| EP | 2492681 | 8/2012 |
| EP | 2529237 | 12/2012 |
| EP | 2541257 | 1/2013 |
| EP | 2573542 | 3/2013 |
| EP | 1494808 | 7/2013 |
| EP | 2872869 | 5/2015 |
| EP | 3080577 | 6/2015 |
| EP | 2064557 | 9/2015 |
| EP | 2917715 | 9/2015 |
| EP | 2931426 | 10/2015 |
| EP | 2969177 | 1/2016 |
| EP | 2982960 | 2/2016 |
| EP | 1663847 | 11/2016 |
| EP | 1691185 | 2/2017 |
| EP | 3185016 | 6/2017 |
| EP | 3225969 | 10/2017 |
| WO | WO2015/109270 | 7/2015 |
| WO | WO2016/084377 | 6/2016 |
| WO | WO2016/164431 | 10/2016 |

\* cited by examiner

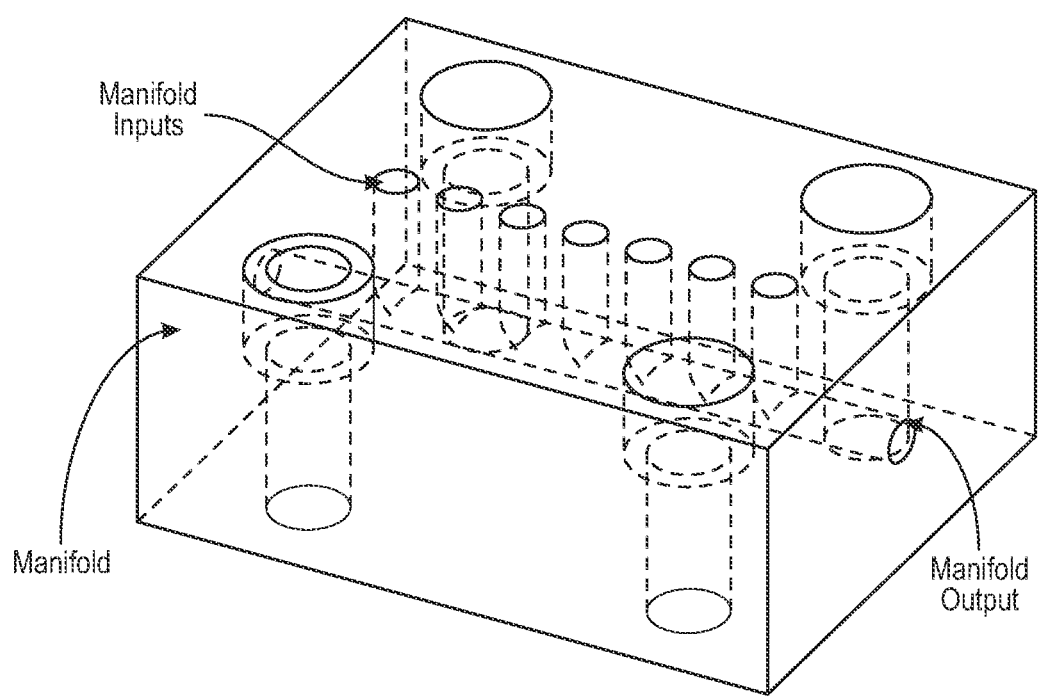
*FIGURE 8*
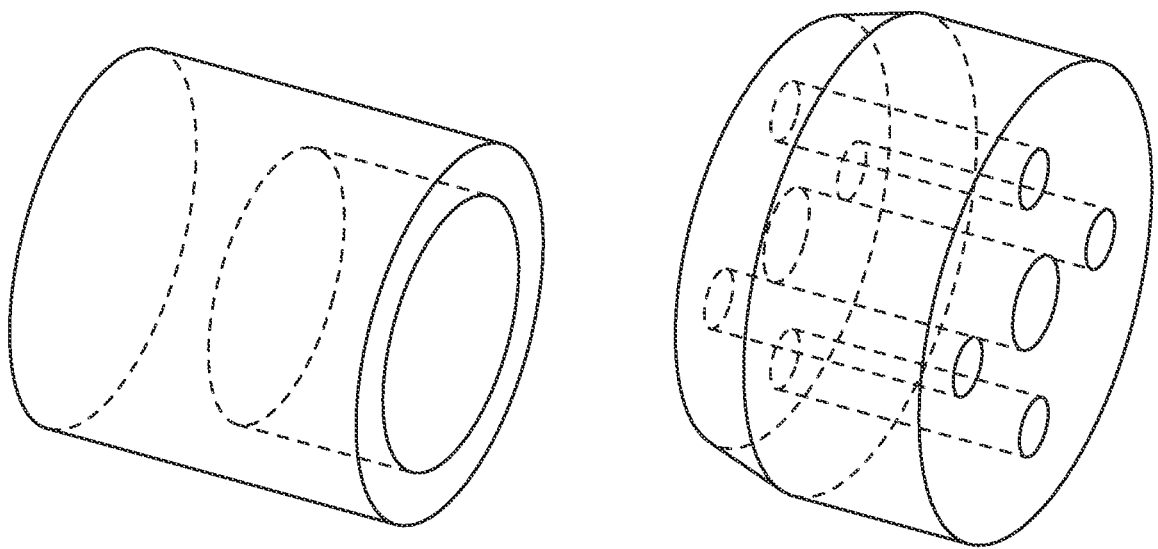
Linear Manifold
Circular Manifold
*FIGURE 9*
*FIGURE 10*

US 11,460,383 B2

AUTOMATED STAINING SYSTEM

PRIORITY CLAIM

This application is a 35 U.S.C. § 371 U.S. National Stage Application of International Application No. PCT/US2017/037857 filed Jun. 16, 2017, which claims priority to U.S. Provisional Patent Application Ser. No. 62/351,166 which was filed on Jun. 16, 2016, the entire contents of which are incorporated herein by reference and relied upon.

STATEMENT REGARDING FEDERAL FUNDING

This invention was made with government support under R44 CA192701, RO1 EB016983, and R44 CA168185 awarded by the National Institutes of Health. The government has certain rights in the invention.

TECHNICAL FIELD

The present technology relates generally to automated staining systems and associated systems and methods. In particular, several embodiments are directed to a bench top automated staining system for staining biological samples contained on a cytological slide.

BACKGROUND

The result of histological or cytological analysis depends greatly on the quality of prepared samples (tissue or cell samples). Inadequate preparation of specimens can result in inaccurate data that causes an error in interpretation of results and misdiagnosis.

The preparation of a sample for analysis typically involves multiple steps such as tissue collection, transfer of specimens to a microscope slide, fixation, and staining. Each step introduces some artifacts due to altering or distorting the natural appearance of cells. Some artifacts, such as those due to staining, are intentional. Other artifacts, such as due to fixation, are induced by intrinsic procedure outcome. Fixation that is intended to terminate ongoing biological processes and stabilize and preserve cell structure can make cells shrink or swell during fixation. As a result, extracellular spaces are distorted by occurred compression or stretching.

There are, however, unintended types of artifacts that are due to the complexity of procedures, which may vary results from run to run. There remains a need to develop optimal staining methods and low-cost systems to reduce and/or eliminate these unintended artifacts and provide high-quality results.

SUMMARY

In some embodiments, the present disclosure provides an apparatus for staining samples comprising, a staining chamber configured to receive at least one staining substrate, wherein the staining chamber and the staining substrate create a closed and defined staining reservoir when placed in contact, the staining reservoir comprising a first port for introducing a fluid into the staining reservoir and/or for removing the fluid from the staining reservoir, and optionally a second port for removing excess fluid/gas.

In some embodiments, the present disclosure provides a method of preparing a sample for imaging comprising staining a sample deposited on a staining substrate in an apparatus comprising a staining chamber configured to receive the staining substrate, wherein the slide chamber and the cytological slide create a closed and defined staining reservoir; and controlling humidity levels within the staining reservoir for at least a portion of the staining.

The systems and methods provided by the present disclosure will increase stain performance, increase longevity and decrease waste and cost.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. Furthermore, components can be shown as transparent in certain views for clarity of illustration only and not to indicate that the illustrated component is necessarily transparent. For ease of reference, throughout this disclosure identical reference numbers may be used to identify identical or at least generally similar or analogous components or features.

FIG. 8 depicts an isometric view of a linear manifold in accordance with an embodiment of the present disclosure.

FIG. 9 depicts an isometric view of a circular manifold in accordance with an embodiment of the present disclosure.

FIG. 10 depicts an isometric view of a circular manifold in accordance with an embodiment of the present disclosure.

DETAILED DESCRIPTION

Staining has been largely performed using a manual dipping technique whereby a technician dips a slide into a series of bins with 50-300 milliliters of solution. Many large scale automated solutions exist however these are often used in high volume labs and cost upwards of $100K. There are very few low-cost solutions that prepare high-quality slides. Moreover, many systems transfer slides from one container to another, creating significant contamination and waste. The disclosure provided herein will remedy these issues and provide a high-quality slide, with minimal waste stream at low cost.

Most advanced microscopy techniques used for disease diagnosis rely on two critical preparation techniques, depositing cells onto a substrate and staining cells with specific stains. Additionally, current diagnostic techniques rely on skilled personnel to distinguish between normal and abnormal matter. Cell clumping, irregular shaped cells or damaged matter may complicate analysis because it is often difficult to distinguish normal versus abnormal cells. Dependent on application, stains may be costly, adding to the burden on smaller research facilities and clinical laboratories. Additionally, some labs may only have very low volume of reagents of solutions such as antibody solutions or drug formulations. It is critical that low-volume treatment be provided.

Figure 1:
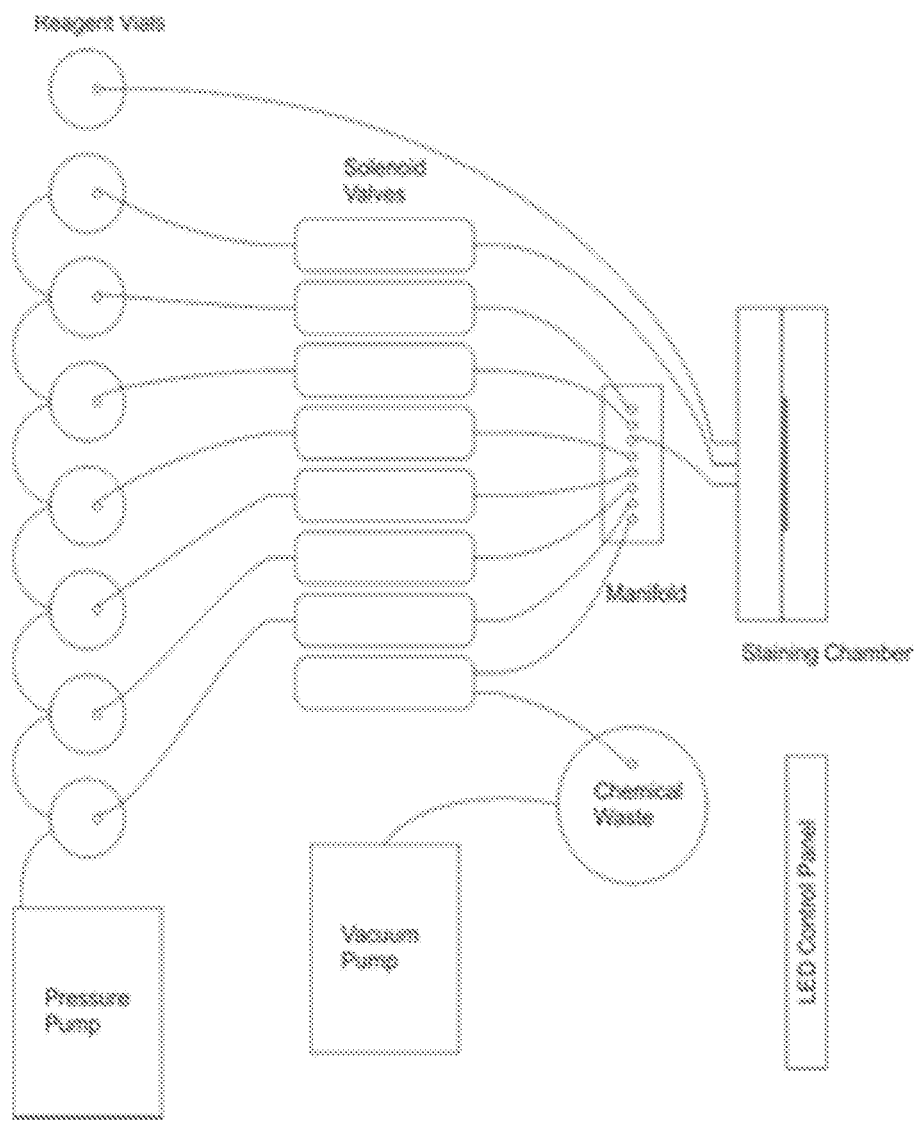
FIG. 1 depicts a block diagram schematically illustrating a staining system in accordance with an embodiment of the present disclosure.

A block diagram schematically illustrating a staining system in accordance with an embodiment of the present technology is described in FIG. 1. The connections between the components in FIG. 1 are representations for tubing. The block diagram illustrated in the image depicts a general representation of one embodiment. The block diagram is a general representation and the embodiment may be modified to provide alterative configurations for specific applications described herein. For example, one embodiment may be configured to operate with the automatic pump down of the system which consists of a normally closed liquid-line solenoid valve installed in the liquid line of a reagents system (FIG. 1). This configuration may save cost in minimizing the number of parts required.

Another embodiment may be comprised of vacuum pumps, or alternatively pressure pumps, and micro-valve technology to transfer very small amounts of solution into a sealed chamber whereby only introducing the required volume of solution into the staining reservoir and onto the surface of the slide.

Figure 2:
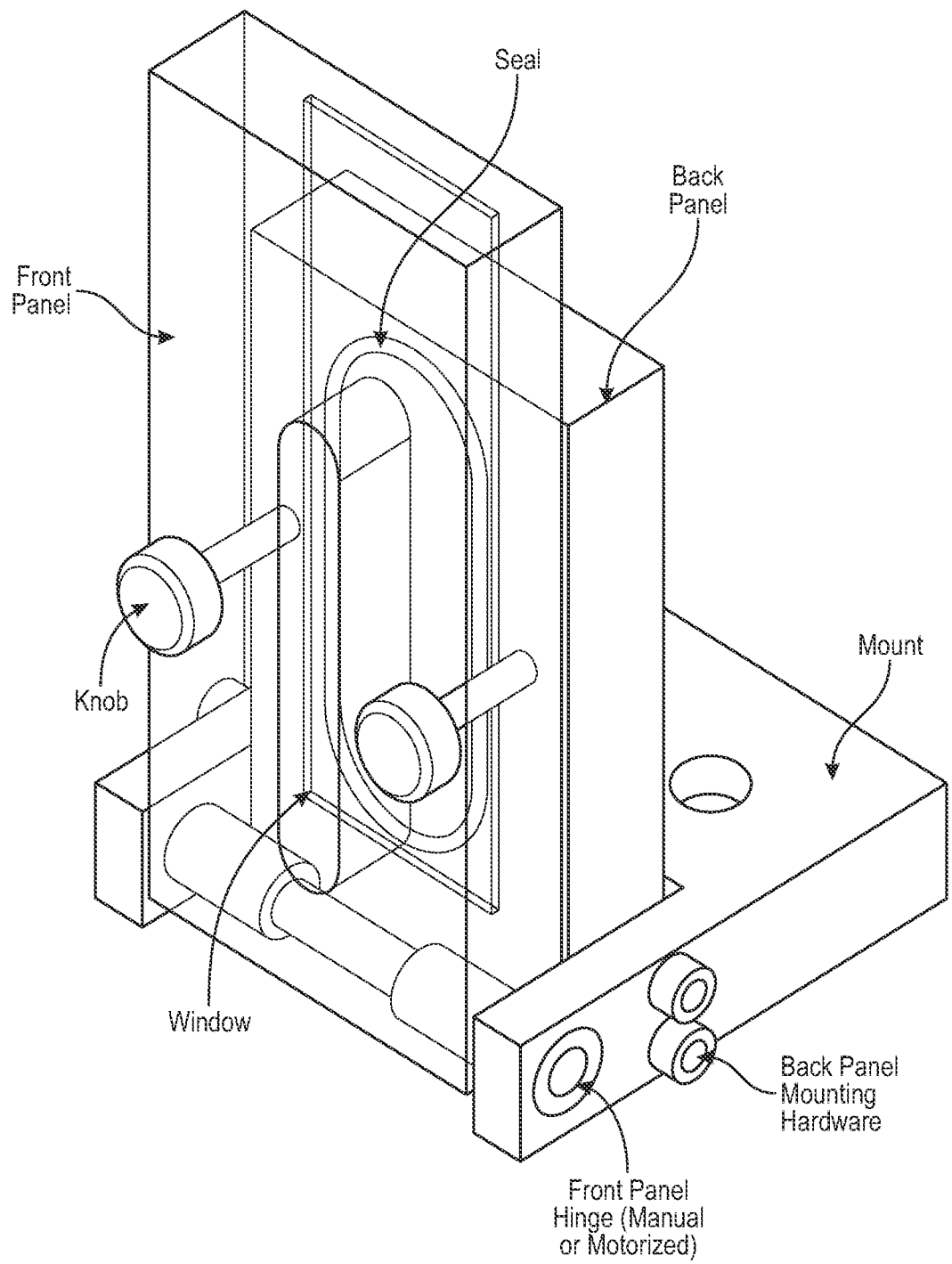
FIG. 2 is an isometric view of a slide chamber/slide holder apparatus in accordance with an embodiment of the present disclosure.
Figure 3:
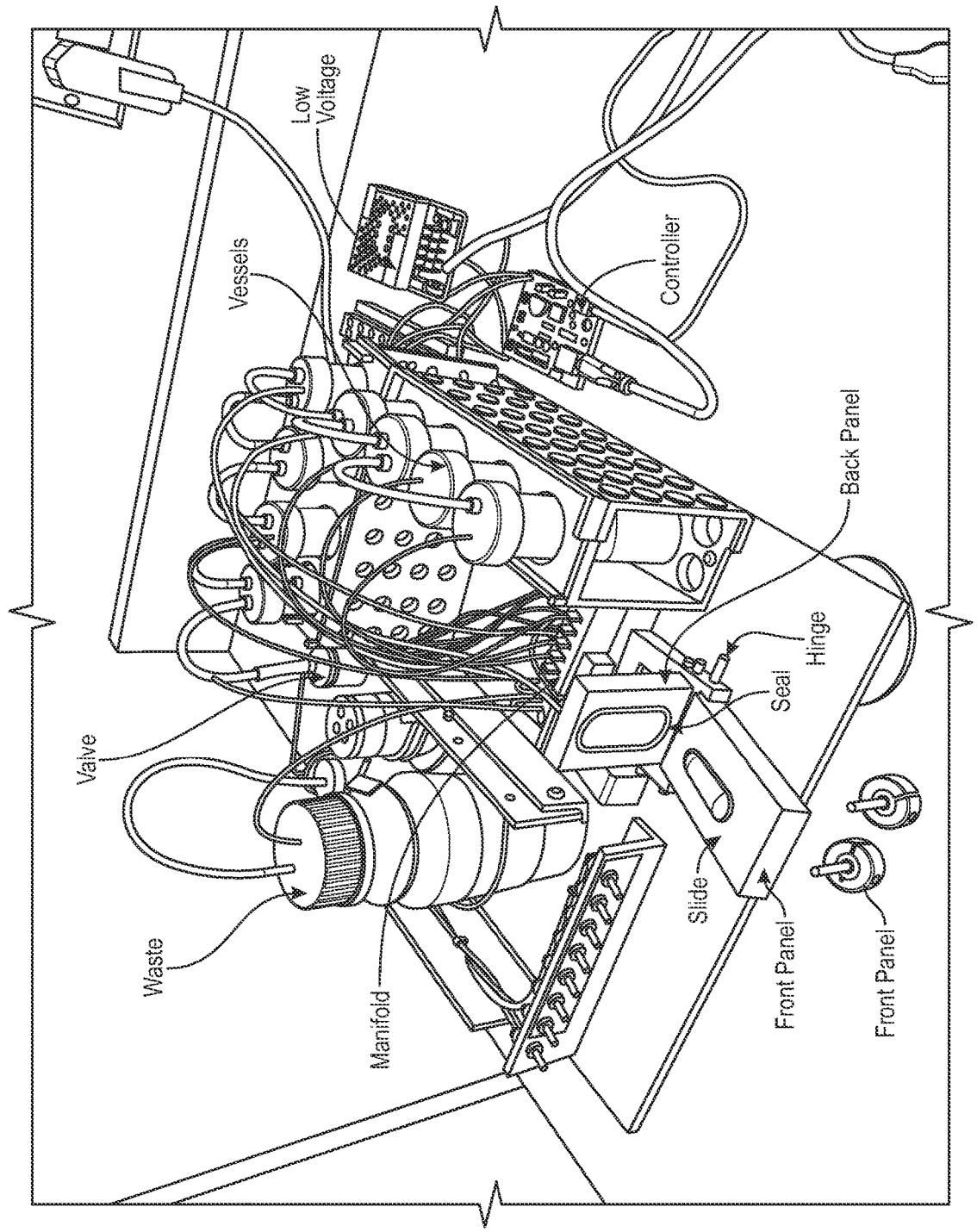
FIG. 3 shows a prototype of a staining apparatus in accordance with an embodiment of the present disclosure.
Figure 4:
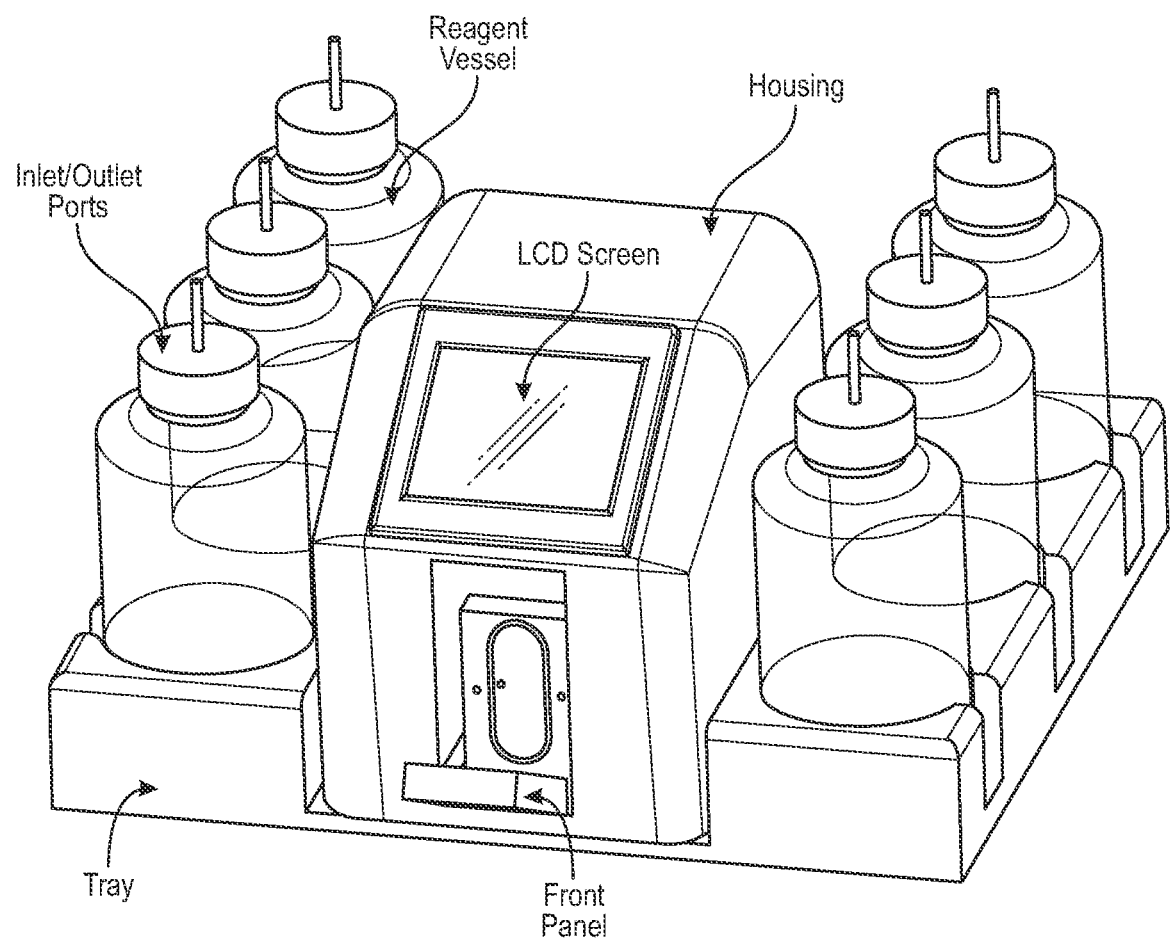
FIG. 4 depicts a concept illustration of an automated staining apparatus in accordance with an embodiment of the present disclosure.
Figure 5:
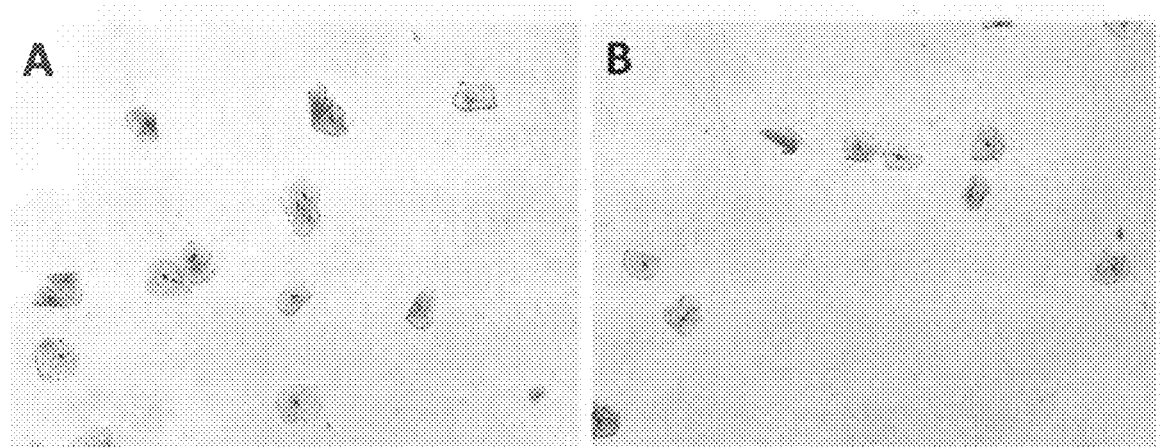
FIGS. 5A-B depicts results of a comparison study using a staining system of the present disclosure (A) versus a conventional manual staining technique (B).

In one embodiment, the chamber assembly is comprised of a back panel, front panel, sealing mechanism, ports, mounting hardware, tubing, and connectors (FIG. 2). A prototype of the following embodiment is shown in FIG. 3. A concept showing the following embodiment is shown in FIG. 4. A controlled comparison using the following embodiment is illustrated in FIG. 5.

Figure 6:
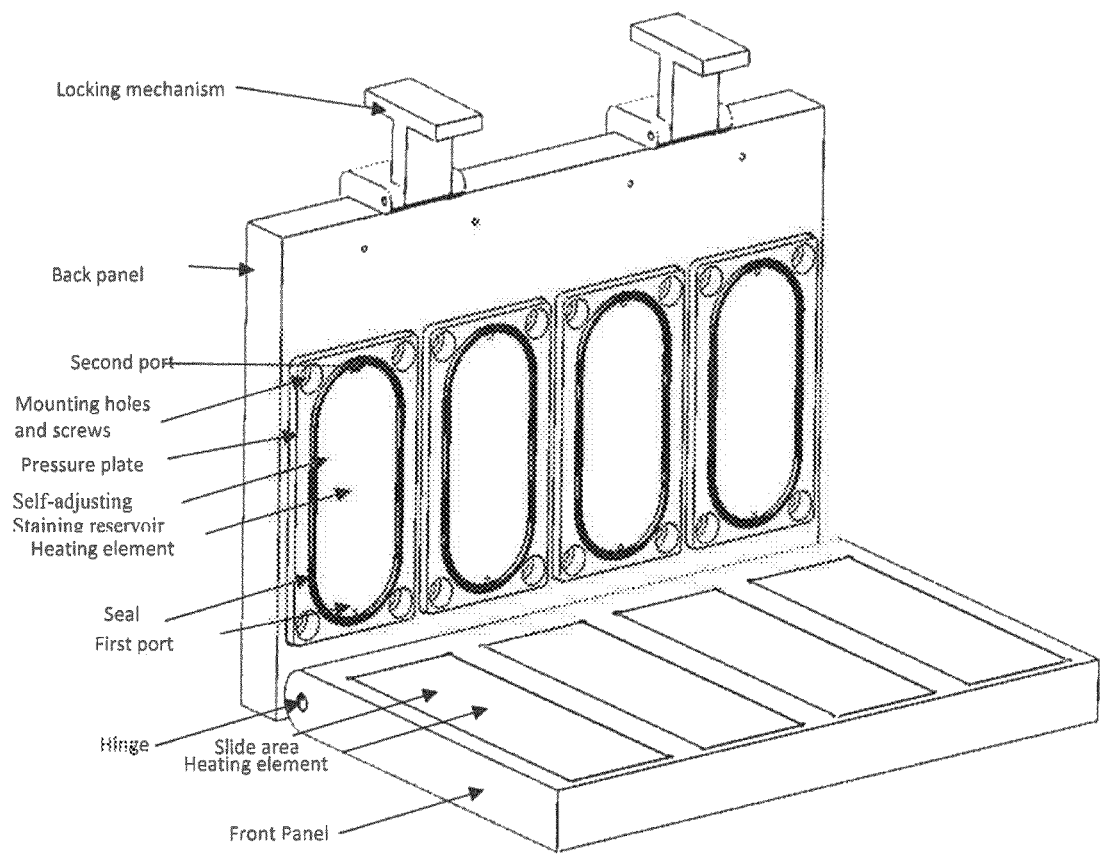
FIG. 6 depicts an isometric view of an alternative slide chamber/slide holder apparatus in accordance with an embodiment of the present disclosure.

In another embodiment, the chamber may be comprised of the back panel, front panel, sealing mechanism, adjustable staining reservoir, reservoir hardware, mounting hardware, tubing, and connectors (FIG. 6).

The apparatus may have the capability of staining one slide or multiple slides (FIG. 6).

The staining reservoir may hold anywhere from several microliters to less than one milliliter of solution, dramatically reducing stain use. The sealed chamber houses the slide and solution is sequentially pumped in and out until the staining is complete.

Components are low voltage, providing an ultra-compact, portable benchtop apparatus.

The reagents are delivered fresh, per run, in very small volumes (<1 mL per cycle).

In one embodiment, the reagents may be filtered back into the vessel to increase the life of the stain/fluid. The stain (or fluid) is delivered from a series of vessels that are connected in series with the sealed chamber. The delivery of staining solutions in an ultra-compact system that prepares slides with superior quality and may be easily adopted by laboratories across the world for its low cost has tremendous opportunity.

In one embodiment, the solenoid is a normally closed electric shut-off valve that is controlled by a computer program to execute a sequence of ON-OFF switches at specific timing or/and sensor readings of volume limit values or cut-off pressure. When the desired solution is scheduled, the program energizes the liquid-line solenoid valve to open the valve that results in filling the staining chamber with the solution. The program keeps the valve open for a certain period of time (this time may be programmed by the user or preprogrammed in the controller) or until a sensor (fluid sensor, flow-rate sensor) reads the desired volume level and de-energize the liquid-line solenoid valve. The system is in idle state while the scheduled chemistry step (staining or washing) is in progress. The solution will be evacuated from the staining chamber (FIG. 2) through another solenoid valve installed in the suction line with a vacuum pump and waste vessel. The solution is evacuated from manifold outlet and all the liquid line coming in and out the chamber to ensure that no fluids will migrate to the line during the next cycle. The lines may have one-way valves connected in series to each inlet and outlet to assist it preventing backflow. The lines may also have filters connected in series with each inlet and outlet to assist in maintaining optimal flow conditions.

In other embodiments, fluids can be delivered to the chamber using miniature inert solenoid pumps that are coupled to supply and waste vessels. The pumps are coupled in series with the vessels and the sealed chamber. The pumps offer the possibility of delivering precise and accurate liquid volumes and greater design flexibility and significant cost savings. The delivery of the solutions may be manipulated by changing volume, time and staining performance. The solenoid valves are turned-on and off by applying a low-DC voltage set to open the valve at 3.5 V and close at 0 V. The valves operate below 12V. The valves are built of chemically inert materials and may prevent degradation from the staining solutions.

In one embodiment, infrared flow sensors connected in series with the vessels and chamber may be used to measure fluid flow.

A closed chamber is formed between the staining chamber and the staining substrate (e.g., a cytological slide).

In one embodiment the staining substrate (e.g., slide) rests in a recessed area on a front panel of the staining chamber that may move on one axis at the hinge. The staining substrate stays in contact with the wall through the entire movement of the panel. The staining substrate may be held in place by a tab in the front panel of the staining chamber (FIG. 6).

In one embodiment, the front panel of the staining chamber may be closed whereby the staining substrate makes contact with the seal, the seal presses against the slide to properly create enough force to prevent liquid from escaping, a knob(s) on the front panel is tightened down by twisting, to obtain increased force and lock the front panel in place (FIG. 2).

In some embodiments multiple knobs may be located symmetrically across from each other (FIG. 2). In some embodiments one knob may be located towards the top of the front panel of the staining chamber. In some embodiments the front panel may be raised or lowered by a motor connected to the hinge In some embodiments, the front panel of the staining chamber may be locked and the staining substrate sealed by raising the front panel of the staining chamber with a motor and tightening the threaded feature using an alternative motor (e.g., DC, Servo, Step) that may be connected to the threaded bolt.

In some embodiments, the front panel of the staining chamber has a window displaying the interior of the reservoir.

In some embodiments, the area of the staining substrate that is stained does not include any labeling area on the slide.

In the embodiments, the staining reservoir has a sealing device on the periphery, for example, an o-ring/rubber gasket/Teflon material. The sealing device can be located on one of the panels or staining reservoir inserts and is large enough to cover a portion of the slide but small enough to fit between the edges of the slide.

In another embodiment, an alternative chamber is disclosed whereby providing self-sealing chambers (FIG. 6). An apparatus for processing at least one sample deposited on a glass slide (may include a series of slides) in a staining reservoir whereby fluid flow (e.g. fluid may be stain, antibody solution, biomarker, pharmacological or chemical agent, etc.), environment (environment being vapor, gas, temperature), drying and hydration is controlled within self-sealing chamber(s).

Figure 7:
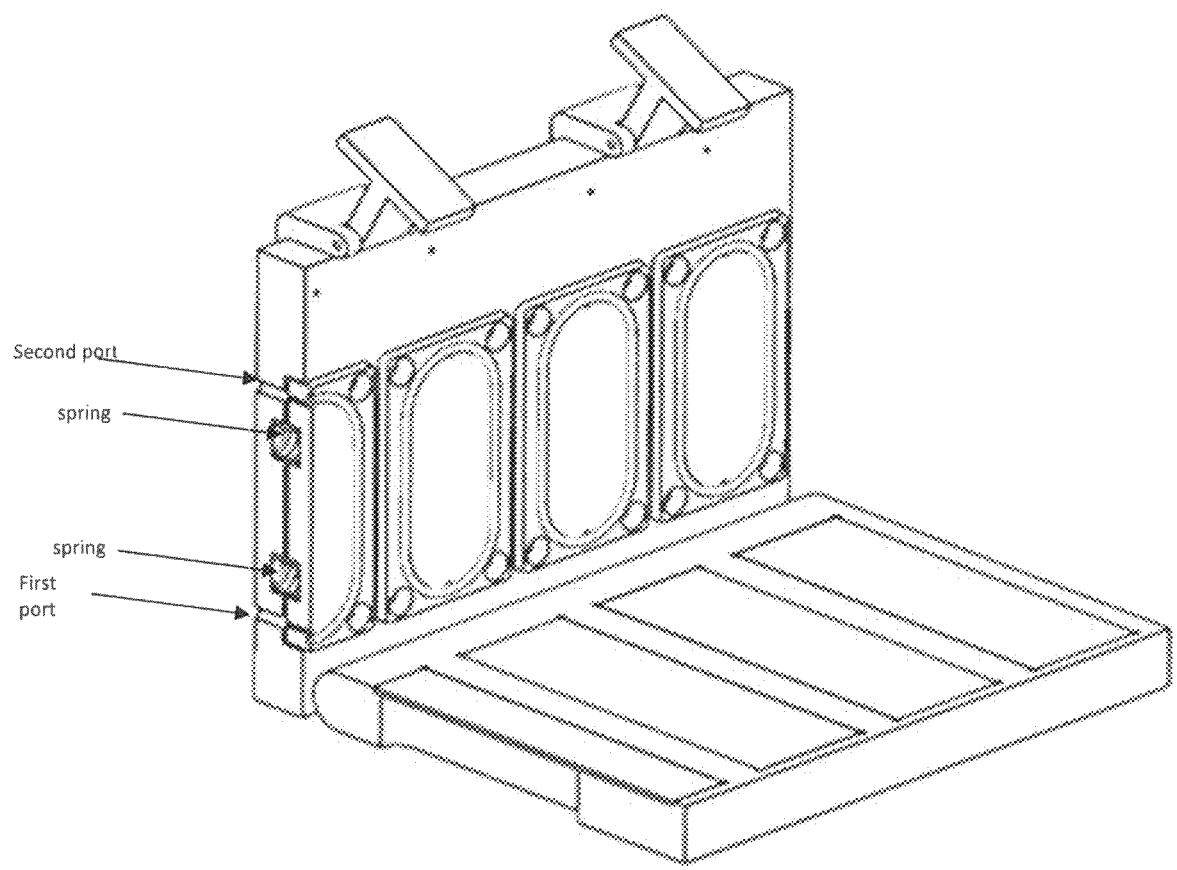
FIG. 7 depicts a cross-sectional view of an alternative slide chamber/slide holder apparatus in accordance with an embodiment of the present disclosure.

In one embodiment, the apparatus comprises at least one milliliter volume self-adjusting staining reservoir (e.g., less than 2 mL, less than 1 mL, less than 500 uL, less than 400 uL, less than 250 uL, less than 100 uL, less than 50 uL, less than 25 uL, and less than 10 uL) for extremely low fluid use per procedure (FIG. 6 and FIG. 7). The staining reservoir size may be decreased or increased to further minimize volume and surface coverage. The apparatus has a front panel of the staining chamber, containing an area for a staining substrate or plurality of staining substrates (e.g., a slide(s)) that moves on a hinge mechanism and folds together with a back panel of the staining chamber. The staining chamber may be plastic or metal. The front panel and back panel of the staining chamber may be interchanged depending, for example, on size of cartridge and number of slides required. in some embodiments, the apparatus has a closure (e.g., locking) mechanism whereby the front panel of the staining chamber is held in place against the fixed back panel of the staining chamber.

The closure mechanism may be manual or automated (whereby a security feature is included to lock the mechanism with electronics and software). The movement of the front panel of the staining chamber may be manual or controlled via a motor In some embodiments, a locking mechanism maintains pressure once closed. The locking mechanism may be spring loaded whereby it provides added force against the assembly. Additionally, the locking mechanism may have a catch, whereby contact prevents the mechanism from unlocking. The locking mechanism may be manual or electronically controlled with a motor.

In some embodiments, the staining substrate (e.g., slide) rests in a recessed well, located in the front panel. Each recessed well can be configured to hold one staining substrate. The recessed well is deep enough to cover at least half of the thickness of the staining substrate. The staining substrate may be fixed with optional tabs that are removeable. Each recessed well may be adapted for slides of various sizes, or substrates of various shape, by adding adapters that is held in place by screws. Each adapter may be designed for specific materials (off the shelf products, custom shapes, etc)

Each pressure plate can be independently controlled using an adjustable design. The pressure plate(s) can have a spring activated mechanism which moves in and out as the force changes. Each pressure plate can be adjustable, for example, with one or a plurality of screws. The internal springs may be interchanged to create different pressures. The pressure plates may be individually controlled (changing in force) by any number of springs (with any spring constant value), located behind the pressure plate and positioned symmetrically to apply even force, as the lid is closed. This design is critical as pressure may not always be uniform between staining chamber and staining substrate, resulting in leakage. Isolating individual staining reservoirs with its own control system is unique to separate control between staining reservoirs. This type of assembly also provides a self-actuating mechanism whereby providing the user with assurance that the system will be sealed properly. The user does not need to be responsible for providing sufficient force. The pressure plate is mounted to the staining chamber by mounting holes and screws and is adjustable. The orientation of the assembly (back panel plus front panel and all internal components) may be positioned so that the slide will be vertical (surface to be treated is perpendicular to the surface the device rests on) or horizontal (surface to be treated is parallel to the surface the device rests on) (FIG. 6 and FIG. 7).

In some embodiments, each pressure plate is designed with a seal (e.g. rubber, o-ring, Teflon, etc.) to press against the slide as the force increases from contact (FIG. 6 and FIG. 7).

Each pressure plate may have an optional sensor within that is depressed once sufficient force is provided with pressure against the staining substrate in order to indicate that a staining substrate is present. The sensor sends a signal back to the controller. The sensor acts as a mitigation for controlling stain to the staining reservoir.

The pressure plate has a port at the top, for removing excess solution and to remove any gas and a bottom port to allow for fluid entry and exit (stain, antibody solution, rinse agent, pharmacological agent) and allowing for the entry and exit of gas (ambient, $N_2$, $CO_2$, controlled humidity) and air flow and suction into chamber and out of chamber into an alternative destination (e.g. waste, recycled material) (FIG. 6 and FIG. 7).

The fluid is transferred into the staining reservoir via tubing that is connected between manifolds (FIG. 8, FIG. 9, and FIG. 10) and back panel (FIG. 6 and FIG. 7).

The apparatus includes the capability of accurately controlling the processing environment, a feature that is critical in many preparation techniques (e.g. biomarker staining, cell morphology staining, antibody hybridization, pharmacological or chemical treatment). The environment of adding and removing fluid may alter the material and be destructive to the process and further analysis of samples. The apparatus has the capability of accurately hydrating and drying by allowing movement of material through the top and bottom ports. Gas (e.g. Air, $N_2$, $CO_2$, etc.) may be allowed into the chamber through the bottom (e.g., first port) or top port (i.e., second port). A prototype of the following device is shown in FIGS. 11-14.

The importance of not having a direct force of gas on the sample surface is critical as it may interfere with uniform drying. The tuning of these features is critical to the processing technique. The pressure of the flow across the staining substrate and sample is important. Therefore, the position of the ports is critical to allow ideal flow across the longer length of the slide surface. The staining chamber may also be heated to control the amount of vapor in the staining chamber.

Fluid and excess gas is removed from the top port (i.e., second port). Fluid and gas is sent into the staining reservoir through the bottom port (i.e., first port). The staining reservoir volume may be about 2 mL, about 1 mL, about 750 uL, about 500 uL, about 400 uL, about 250 uL, about 100 uL, about 75 uL, about 50 uL, about 25 uL, about 10 uL, about 5 uL, about 1 uL, or less (but adapters or alternative chambers may be fitted with significantly lower volumes) whereby only minimal fluid and air needs to be present during any step, saving material (highly advantageous for applications whereby material is expensive, difficult to obtain/produce). In some embodiments the staining reservoir volume is between about 1 mL and about 750 uL, about 1 mL and about 500 uL, about 1 mL and about 250 uL, or about 1 mL and about 100 uL. In some embodiments the staining reservoir volume is between about 2 mL and about 750 uL, about 2 mL and about 500 uL, about 2 mL and about 250 uL, or about 2 mL and about 100 uL In some embodiments the staining reservoir volume is greater than about 1 uL, greater than about 5 uL, greater than about 10 uL, greater than about 25 uL, greater than about 50 uL, greater than about 75 uL, greater than about 100 uL, greater than about 250 uL, greater than about 400 uL, or greater than about 500 uL. Air, gas, humidity control is provided by a vessel with a fluid, a heating element or an additional vaporizer which could be attached to the apparatus. Tubing (greater than 1 mm in diameter) connects any vessels with the environment chamber. An apparatus may have active control, using a pump/valve to maintain an environment by allowing forced movement into the chamber and across the slide. Alternatively, the system may have passive control whereby the ports are open to an established internal environment. The environment is monitored by a sensor inside the environmental chamber (and/or inside the chamber). Humidity sensors may be added into the environmental chamber. The system has an optional heating element and temperature controller to vary the relative humidity and temperature in each chamber. Each sample may be treated independently with varying degrees of wetting/drying in any programmed configuration. Heat may be provided to increase stain solubility and vary drying and alter the humidity of the environment. The humidity mechanism may be used as ambient conditions (no active control). A liquid environment may also be heated using a heating element to increase the amount of vapor in the environment.

The system may accommodate a plurality of reagent vessels which may house various solutions (e.g. stain, antibody, rinse, fixative, etc). The protocol may include any number of fluid addition steps, rinsing steps, fixation steps, hybridization steps, etc. The apparatus may include a shaker for the vessels that would help mix the solutions before use. The apparatus may include a pumping mechanism into and reagent vessels which allows the solution to mix properly before use. The controller may be set up to accommodate a multitude of steps, established either by the user or preprogrammed.

Figure 11:
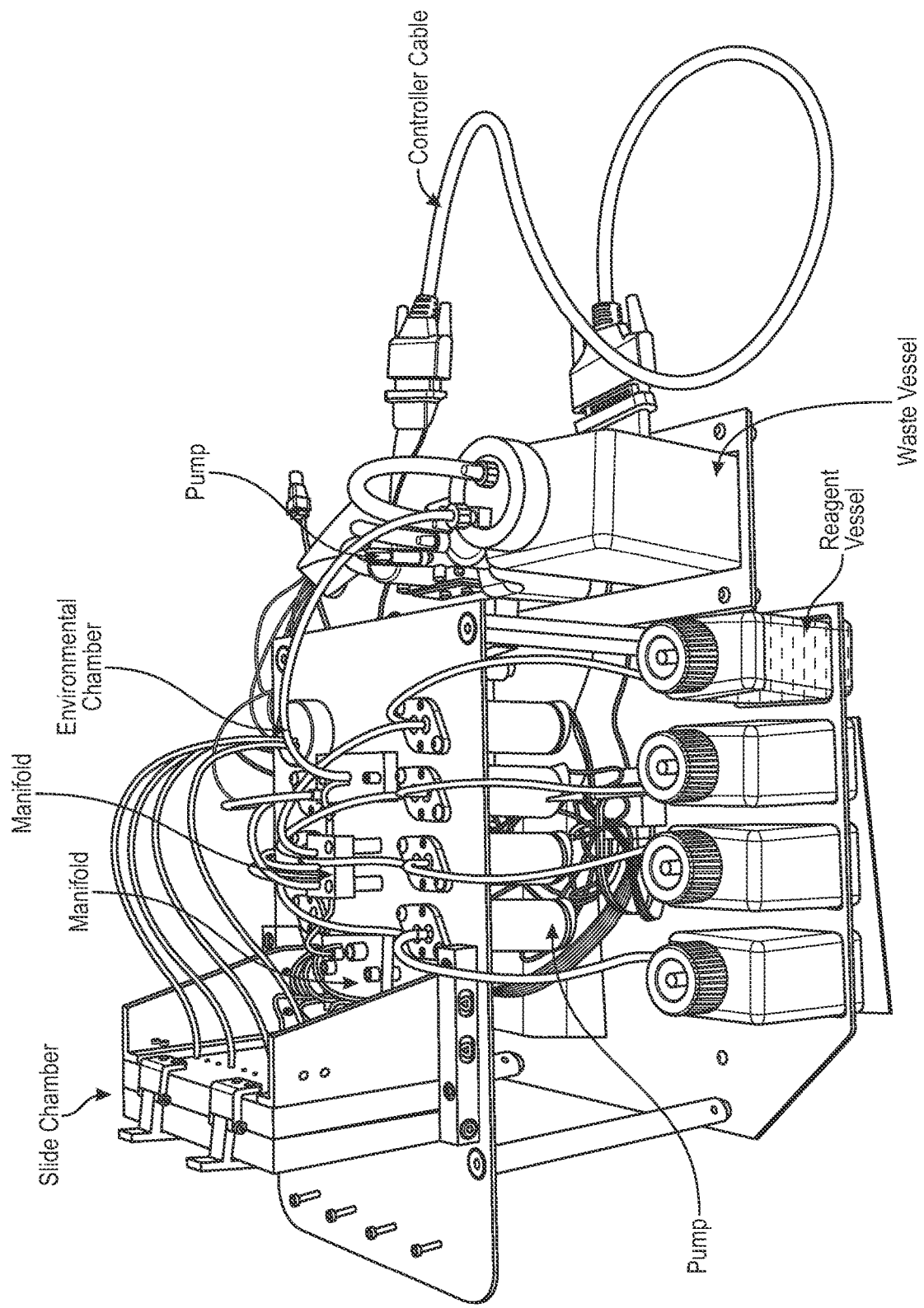
FIG. 11 depicts a prototype of a staining apparatus in accordance with an embodiment of the present disclosure.
Figure 12:
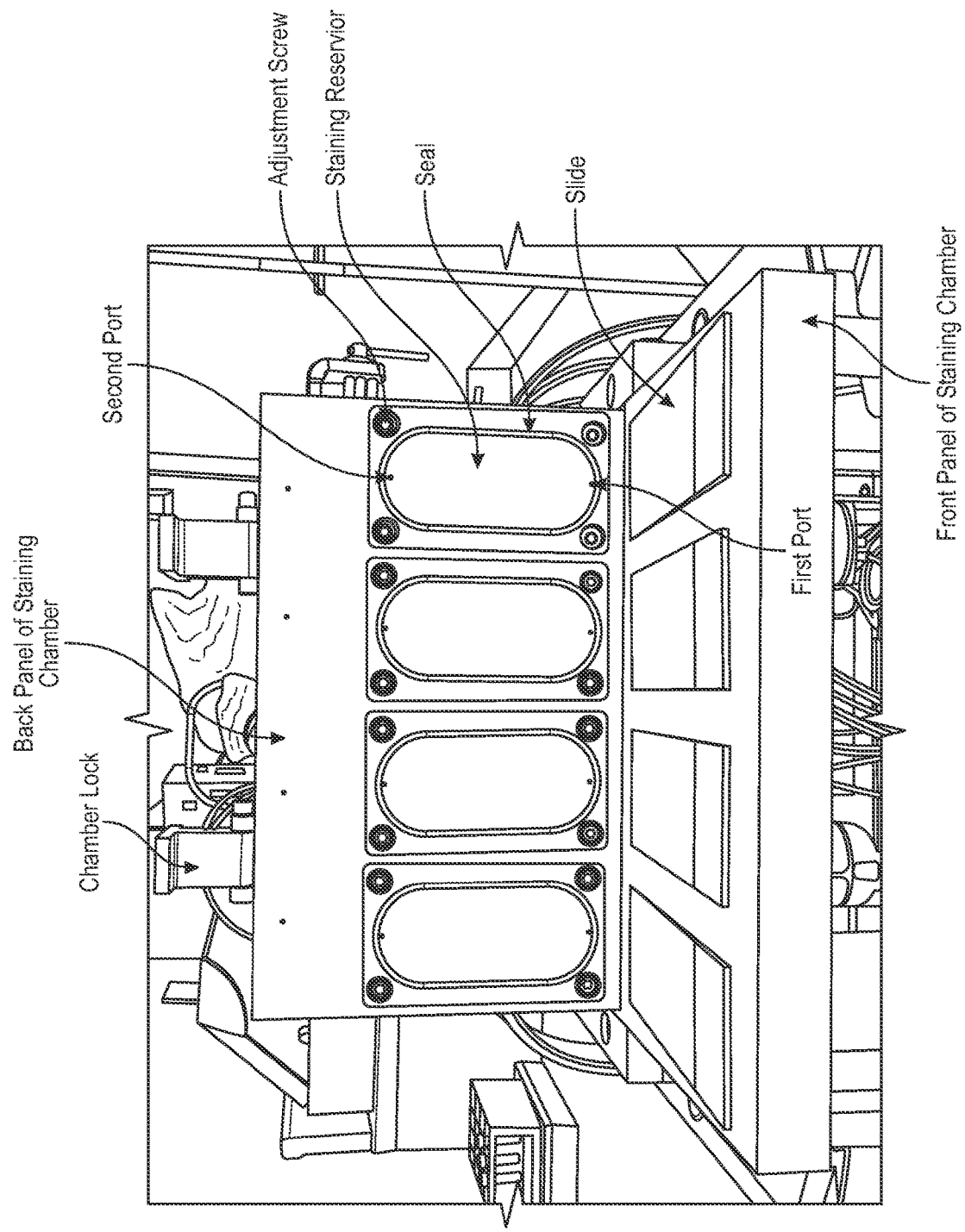
FIG. 12 depicts a prototype of a staining apparatus chamber interior in accordance with an embodiment of the present disclosure.
Figure 13:
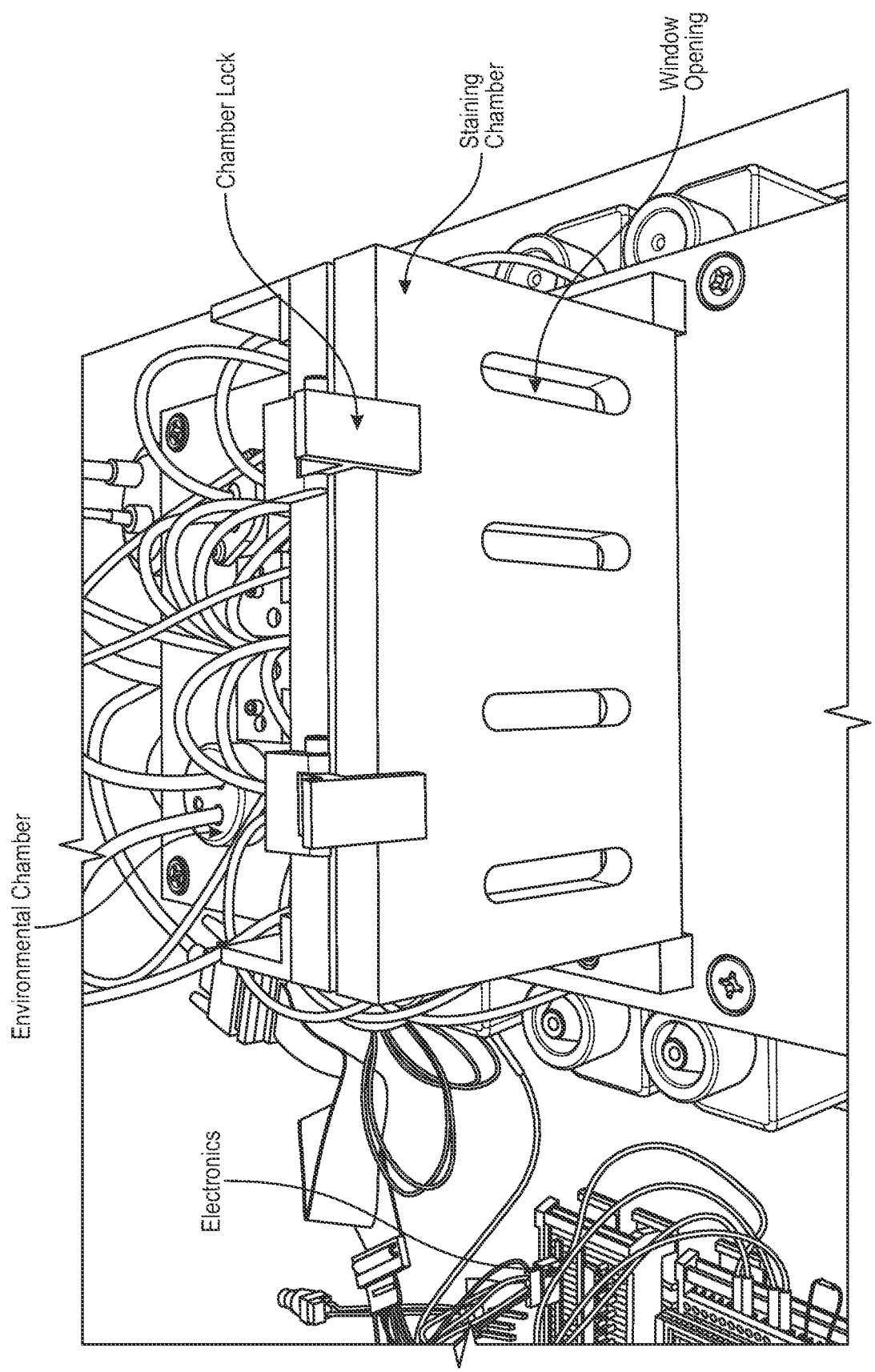
FIG. 13 depicts a prototype of a staining apparatus chamber in accordance with an embodiment of the present disclosure.
Figure 14:
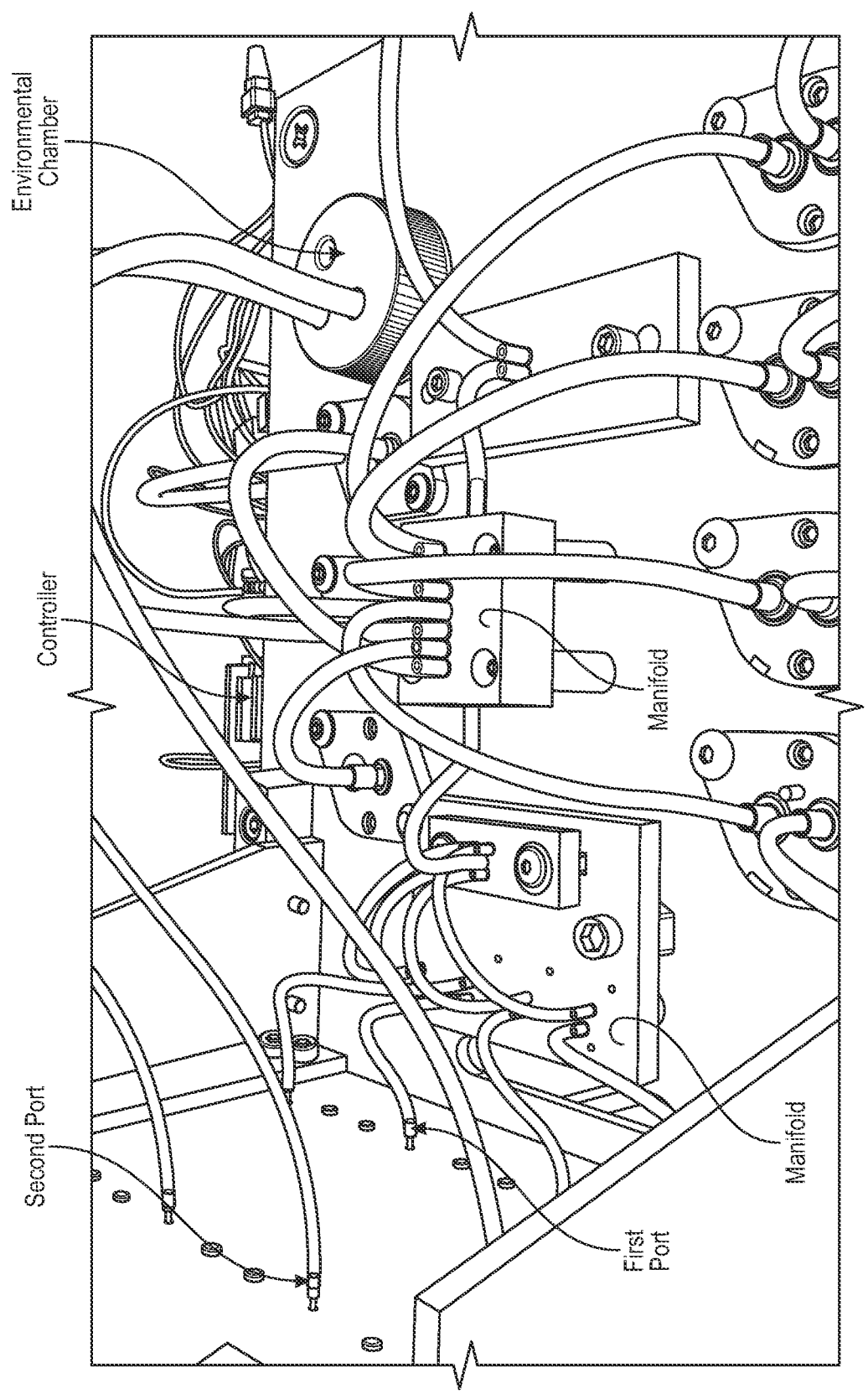
FIG. 14 depicts a prototype of a staining apparatus manifold connection in accordance with an embodiment of the present disclosure.

The apparatus may include an integrated disposable fluidic vessel mechanism. Each vessel may be interchanged depending on application (FIG. 11). Each fluidic vessel may house a pre-filled stain solution. Alternatively, various agents (primary antibodies, secondary antibodies, cell culture media) may also be incorporated into the vessel. The design may incorporate a barcode scanner whereby the vessel is scanned and the apparatus recognizes the solution and adjust settings accordingly. Alternatively, custom solutions may also be added and system may adjust accordingly. Automated volume control, using electronic pumps/valves, is provided depending on staining application. The control of volume to and from the chamber is critical as staining for an accurate amount of time is very important for many staining applications. Additionally, in order to ensure that variation is decreased, automation of fluid flow is properly controlled The gas/air flow may be 0-10 psi of air through the chamber. The vacuum through the system may also be customized to 0-10 psi.

The apparatus may also be designed with a heating element within the chamber, mounted into the self-adjusting staining reservoir or into the front panel of the staining chamber. The material or liquid is channeled into the staining reservoir through a series of top and bottom ports. The ports are connected to the manifold by tubing connectors/adapters and tubing.

Uniform distribution of fluid between multiple staining trays is an important factor in the proper operation of the staining apparatus. To insure even flow-rate through each tray the design and location of distribution manifolds is very critical. The proposed designs ensure even flow rate across all outlets and enables consistent fluid supply for each staining chamber.

Different manifold (FIG. 9 and FIG. 10) configurations are possible however circle manifolds (FIG. 10) are preferred, as they tend to minimize lateral length and manifold size. Smaller manifolds have low volume that minimizes flow variation and discharge volume that may flow back to the chamber after the pumping has stopped. Another critical design feature is the inlet and outlet port diameters. A smaller output diameter allows for more uniform distribution however the hole diameter cannot be too small to avoid high resistance to the fluid flow. A certain minimum pressure (~5 psi+/−5 psi) shall be maintained to minimize variation in the system and provide consistent flow.

The manifold and pipes should be installed below the staining chamber (top and bottom) ports so that applied fluid completely discharges from the chamber. Following the above requirements several different manifolds were designed to provide proper functional operation of the device.

One configuration is a linear manifold. Linear manifolds may be used that combine multiple inputs from different fluid sources and distribute them to the staining chamber though a single outlet. It also provides discharge of fluid through evacuation outlet connected to waste vessel. The diameters of the manifold inputs and outputs may vary (greater than 0.5 mm).

Alternatively, a circular manifold may be used to distribute a single input into four outputs. The diameters of the manifold inputs and outputs may vary (greater than 0.5 mm).

The manifold is designed with at least one manifold output depending on the requirement. This manifold output is connected to the chamber top port. The manifold may have a plurality of manifold inputs. The manifold inputs are for connecting any tubing connectors/adapters and tubing which leads to the solution vessels (stain, rinse, custom antibody solution). Each manifold output may be connected to each manifold input. The manifold is designed with at least one input that is at least 0.5 millimeters in diameter. The input diameter may be increased to modify flow. Each output is at least 0.5 millimeters in diameter. Each input and output may have a manual valve that is controlled to alter the resistance through the system, providing the ability to alter the flow. Alternatively, one manifold output or a series of manifold outputs may be connected to a series of manifold inputs as required for each application. The manifold is mounted with screws through mounting holes. The manifolds inputs and outputs may have fluid and gas flow sensors connected in series to monitor flow within the system. The manifold may be a linear manifold or a circular manifold. Alternatively, the manifold may be composed of several combinations of linear and circular manifolds. The geometry may be modified to fit the application. The number of ports and sizing may be modified to fit application.

Additionally, the manifold may have a heating element attached to a surface in order to uniformly control the heat of the materials being transferred into the chamber. The heating element would be connected to the controller.

Reagents are pumped into the chamber through an inlet port (i.e., first port), that is on one end of the staining reservoir and leaving through an outlet port which may be the same port as the inlet or an alternative port located near the inlet port. To prevent an air bubble trapped inside the staining reservoir an air outlet is added in the very top of the chamber. Excess gas or liquid may escape out of this top port.

The addition and aspiration of liquid or gas/air through ports into the staining reservoir comes through a manifold connected via flexible tubing to the solenoid pumps. When the door is closed, the staining reservoir is sealed that retains a thin layer of the fluid in physical contact with the microscope slide. The closed fluidic system enables a good control over evaporative losses, processing temperatures, volumes of utilized fluids, processing speeds, relative humidity and air flow.

The staining reservoir may have a heating element (e.g. thermally conductive backing, heating wire, heating pad, etc.) for providing heat transfer to the fluids and slide. The staining reservoir may have a heating element connected through the staining chamber. The lines may be sent through a heating element whereby fluid temperature may be controlled. The vessels may have heating elements within them to change the temperature of the fluid.

In some embodiments, multiple staining reservoirs may be added to the system. The system is customizable to any number of staining reservoirs. Each staining reservoir can have its own ON/OFF fluid dispensing valve for individual control of every staining process. The operation may be controlled with a controller that is connected to a PC or LCD.

The reagents (e.g., stains and washing buffers) are stored in the closed (e.g., capped) vessels (i.e., cartridges) on the side of the staining system. A certain amount of the reagents stays in the tube lines coming to the pumps. A prototype of multiple embodiments are shown in FIG. 3 and FIG. 11-14. The vessels may be prefilled with solution and sealed or the user may add vessels that are filled with a custom solution (stain, fixative, anti-body solution, reagent, media, etc).

A concept for the alternative automated stating system is shown in FIG. 4. The staining system may include automation to simplify the staining and minimize user interaction. The system will be powered by low voltage equipment so that it is efficient and has minimal safety risk to the user. The system will be controlled via a front facing LCD (e.g. touch screen) to simplify use and make it more portable. The system will be designed with a staining chamber to house a staining substrate (e.g., standard glass slide). The staining chamber will seal once the staining substrate is loaded using a manual or motor control. The torque will be regulated with motor feedback.

In some embodiments, the staining chamber and or/staining reservoir may have several ports for fluid ingress and waste removal.

In some embodiments, vacuum pump will create pressure and/or suction within the system to allow for uniform flow from vessel to chamber. Alternatively, a pump (solenoid, peristaltic) may also be used to move fluid from one area to another.

The system may include a design to allow a solution to be mixed. One option is to cycle the solution through the reagent vessel. The valve may be activated to close the port to the chamber and provide an alternate path through the reagent vessel. The flow of the fluid will provide mixing. Moreover, the flow may be pumped in two directions, allowing mixing. For example, the solution may be intermittently pumped back and forth, allowing several microliters of solution to flow back and forth, creating a mixing effect.

The solutions may be stored in reagent vessels which may be located outside the main unit enclosure. The fluid may be transferred from the reagent vessels to the chamber using a vacuum pump mechanism. The fluid rate may be varied by timing programming.

The fluid may also be controlled via solenoid pumps. Each pump may control 1 fluid vessel.

The regulation of fluid flow may be controlled by feedback from pressure sensors. Each valve may have a one-way valve to ensure that no mixing of solutions occurs. The sensors can ensure that fluid is still present in the reagent vessels. If the fluid is gone, an error message may be triggered. Once the fluid is in the staining reservoir, it may be pumped out into a waste vessel. The waste vessel may have a one-way valve to prevent backflow. The chamber may have a drying mechanism that will ensure rapid preparation of the sample.

The system may allow for customizable staining whereby not restricting the user to a specific staining protocol, as other technologies have done with equipment for gram staining or specific H&E protocols. A critical feature of the system is the significantly small, fresh, controlled volume of stain that is used per stain cycle under a highly controlled environment. The staining reservoir volume can be less than 2 mL, less than 1 mL, less than 750 uL, less than 500 uL, less than 400 uL, less than 250 uL, less than 50 uL, less than 10 uL, less than 5 uL, or less than 1 uL and is delivered fresh per stain cycle. Current technologies, such as manual dipping, use over 50 mL and these solutions need to be changed by the user. Often they are reused, creating downstream problems for analysis. Additionally, these solutions are often not changed and become dirty, used quickly and contaminated. Moreover, since being exposed to air, they often degrade in quality. Going through a high volume of stain quickly increases the overall cost of the device.

The systems and methods provided by the present disclosure will increase stain performance, increase longevity and decrease waste and cost. The advantages discussed, fresh stain, microliter volumes of solution per step, controlled environment, sealed system, sensors or control and feedback will provided optimal preparation of samples. The system is fully contained, whereby all liquid is maintained inside the system and the user does not come in contact with any fumes or hazardous material until there is a need to fill or remove waste.

One staining method that was used to evaluate the systems included a series of steps that included rinsing and staining. First the chamber was flushed with 1 (or more) rounds of rinse reagent to provide increased wettability. The flushing occurs within a few seconds. The flushing step is optional as it may not be required for some applications. Moreover, the flushing step may also improve chamber cleaning and remove any debris (dust, particulate, etc.) from any previous step. Next the chamber is filled with $DIH_2O$ and held for a duration of 55 (+/−10) seconds. Then the $DIH_2O$ is removed and the chamber is filled with hematoxylin and held for a duration of 25 (+/−10) seconds. The hematoxylin is removed and the chamber is filled with $DIH_2O$ and held for a duration of 30 (+/−10) seconds. The $DIH_2O$ is removed and the chamber is filled with clarifier and held for a duration for 35 (+/−10) seconds. The clarifier is removed and the chamber is filled with $DIH_2O$ and held for a duration of 30 (+/−10) seconds. The $DIH_2O$ is removed and the chamber is filled with Bluing Reagent and held for a duration of 25 (+/−10) seconds. The Bluing reagent is removed and the chamber is filled with $DIH_2O$ and held for a duration of 30 (+/−10) seconds. The $DIH_2O$ is removed and the chamber is filled with a solution of 95% ethanol and held for a duration of 30 (+/−10) seconds. The solution of 95% ethanol is removed and the chamber is filled with Cytostain and held for a duration of 25 (+/−10) seconds. The solution of Cytostain is removed and the chamber is filled with a solution of 95% Ethanol and held for a duration of 55 (+/−10) seconds. The solution of 95% Ethanol is removed and the chamber is filled with a solution of 100% Ethanol and held for a duration of 55 (+/−10) seconds. The chamber is connected to a environmental chamber that produces a range of humidity. However, the following steps were performed with a relative humidity level of at least 45% RH. The protocol may be manipulated with many durations and may be optimized for each application. The stain intensity may be manipulated by changing the duration of each step. The following protocol was one of several ran to demonstrate performance. The filling of chambers takes less than 3 seconds. The evacuation of liquid from the chamber takes less than 5 seconds.

Any combination of the above staining protocol may be used with the system. Any timing and volume may be used throughout the staining protocol. Environmental control may also be varied to include any segment of the protocol or through the entire process. Drying may be varied by leaving the slide in the chamber under control or by providing forced air into the chamber but not directly onto the slide. The air comes in a one end of the slide and is circulated inside the chamber and evacuated through a port.

Having high quality stained samples is critical to precise analysis. A staining procedure was used to set a base line for the technology. The staining procedure was performed using the staining systems and methods described herein and compared to following the same procedure in a manual dipping method. Results of this comparison study are shown in FIG. 5. As illustrated in the image, the staining systems and methods of the present disclosure (FIG. 5A) yield similar results in terms of the intensity of the staining, as compared to conventional manual methods (FIG. 5B). From a qualitative standpoint, the color, saturation, hue and contrast is comparable between the two data sets. In addition, the nucleus is well stained using both the staining systems of the present disclosure and conventional manual methods. Importantly, the staining system described herein used significantly less reagent.

Figure 15:
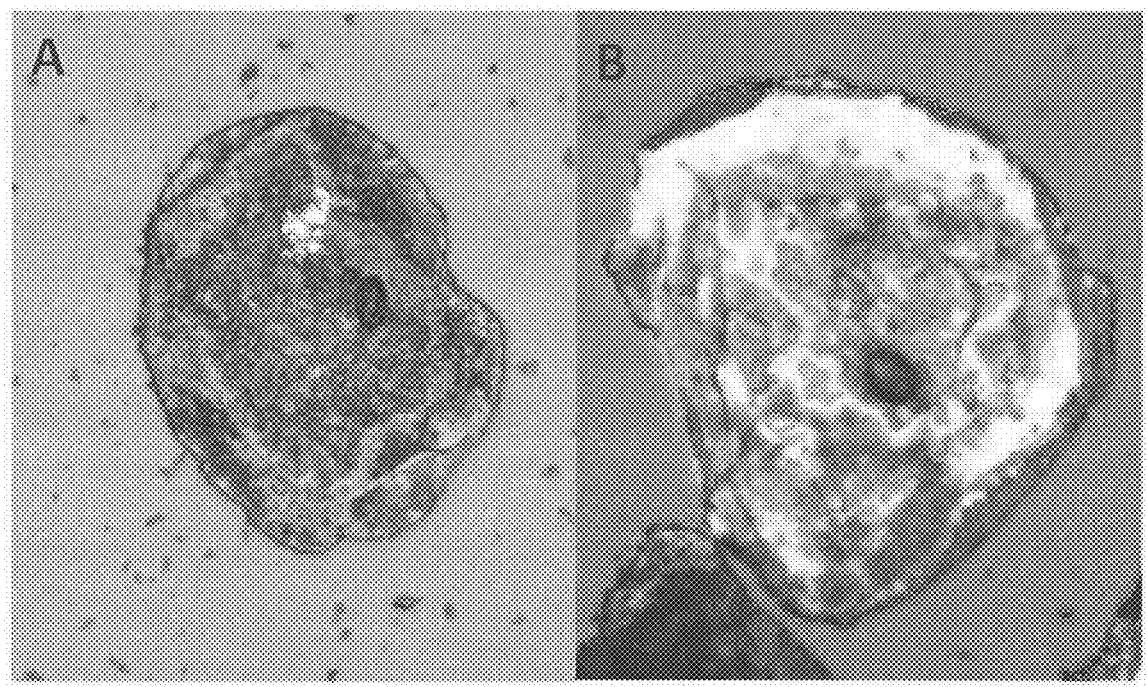
FIG. 15 depicts results of a comparison study using a conventional manual staining technique (A and B). The conditions were performed under atmospheric conditions with no environmental control.

The benefit of the apparatus of the present disclosure is that it is able to prepare a sample under controlled conditions. Each step of the process may be accompanied with a balance of hydration and drying. The following study was performed to compare controlled and uncontrolled environmental conditions. Using an uncontrolled procedure whereby the humidity within the chamber and within standard staining bins was not controlled and was atmospheric at the time (<45% RH), resulted in highly altered cells as illustrated by the reflective rainbow effect in FIG. 15. The sample was exposed to atmospheric conditions throughout the entire procedure whereby decreasing variables. The apparatus allows for this standard operation. However, it also provides the ability to control and tune the apparatus to a custom application. In standard microscopy techniques this phenomenon may not be of great importance as unique cell features are not as critical. However, this would be detrimental for spectral analysis techniques, feature/structure identification techniques (computer analysis, pathology, etc.) and any image-based diagnostic analysis. Non-limiting image-based analysis include compound microscopy, confocal microscopy, scanning electron microscopy, transmission electron microscopy, Fresnel incoherent correlation holography (FINCH) microscopy, or partial wave spectroscopic (PWS) microscopy.

In order to prevent a staining sample (e.g., biological material) from rapidly drying out and negatively affecting its structure and appearance, it is critical that some level of hydration (alternatively gas, air flow, etc.) be provided throughout a staining procedure. Each step in a procedure may require its own unique conditions (technique dependent). For example, if controlled drying after a fixation step is required, this step may be isolated and sufficient humidity (alternatively $N_2$, $CO_2$, etc.) may be supplied for a specified time with a specified flow rate. If a series of steps require a wide range of humidity/flow/gas levels, these conditions may be programmed into the controller. The wide range of relative humidity may be applied to the sample (example: 1-100% relative humidity) for a given period of time which would be programmed by the controller. The gas may also be sent into the staining reservoir(s) with varying pressure for control flow over the sample allowing for more accurate control during treatment. The apparatus may have optional features to allow for manual control of these features. Alternatively, these features may also be preprogrammed to streamline use.

Figure 16:
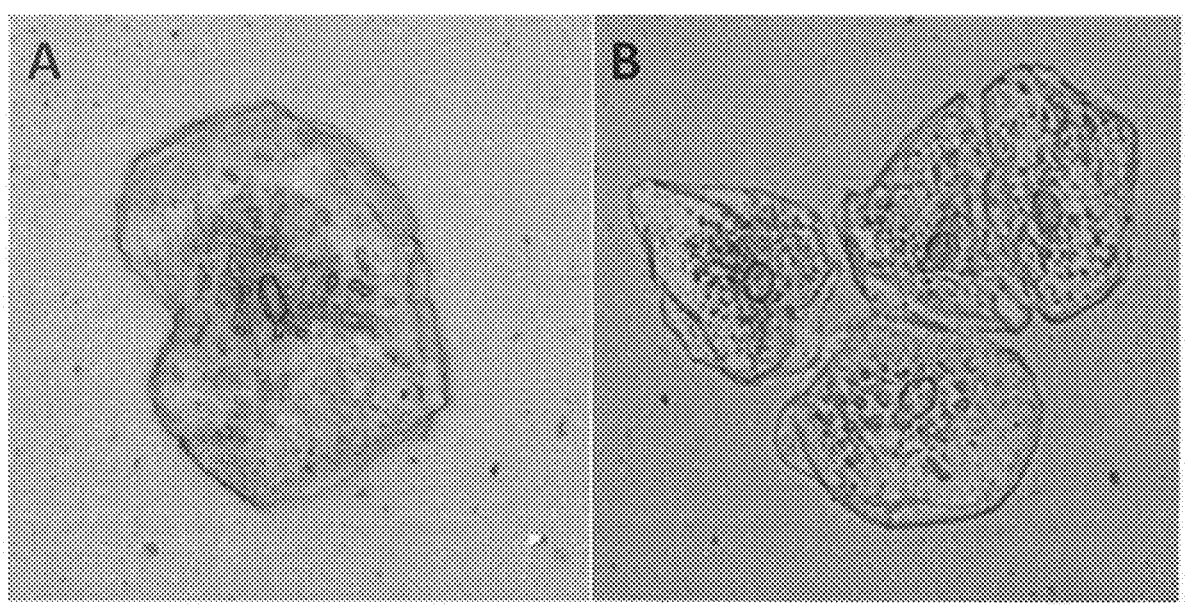
FIG. 16 depicts results of a study using a staining system of the present disclosure under controlled environmental conditions. (A and B). High magnification of group of cells.

The apparatus was programmed to control environment. The staining procedure was performed, whereby humidity of at least 45% RH was provided throughout the staining procedure from step 1 to the last step. The environmental chamber was filled with at least 100 mL of $DIH_2O$ and was heated, using a heating element, until the humidity stabilized at 50%+/−5% RH. A controlled has feedback with the heating element and the humidity sensor to control the environmental conditions in real-time. The controlled air was injected into the chamber at low pressure (<10 psi) during each step of the procedure described in the document. The data demonstrated that by controlling the fluid flow, step time, humidity, hydration and drying, the reflective rainbow artifact was eliminated (FIG. 16).

Figure 17:
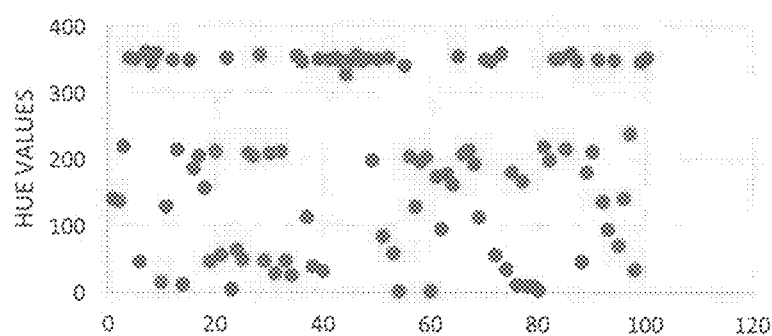
FIG. 17 depicts results of a study using a manual staining process.
Figure 18:
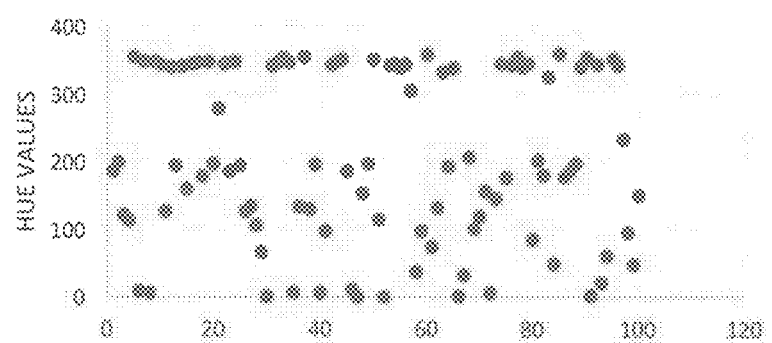
FIG. 18 depicts results of a study using a staining system of the present disclosure.

A direct comparison of the apparatus and standard technique (manual bin dipping protocol) was performed to demonstrate similarity and the capability of fine tuning the staining protocol to minimize variability. The goal of this optimization was to obtain similar results to manual staining. Since, the gold standard for staining is manual dipping, we wanted to show that our system may perform similarly but provides many benefits. Results indicated that the methods showed similar stain performance, indicating that our system could be programmed to match similar methods or alternatively, customize use to technique (FIG. 17, 18, and Table 1). Using the Papanicolaou stain protocol, a commonly performed staining method, a comparison was performed to understand the hue levels in the red and blue wavelength range. The ranges were kept constant in the comparison between our system and the manual system. The goal was to establish how similar the two methods would be after program optimization. A comparison of red and blues ranges were chosen as the stains are meant to stain cellular components red and blue. Three slides per group were subjected to both manual and automated staining techniques. A hundred cells on each slide were acquired and analyzed by averaging the pixels within each cell. Values were similar in saturation and lightness with similar hue values and low standard deviation. A significant improvement was also noted in the decreased variability between slides. In addition, greatly improved consistency between slides will provide enormous benefits for more accurate analysis. Alternatively, modifying the timing, rinse protocol, stain times, for example, may alter these values to optimize conditions based on requirements.

TABLE 1

Comparison of Manual Dip Process and Automated Staining Apparatus

| Slide | Red Cell Average | | | Blue Cell Average | | |
|---|---|---|---|---|---|---|
| | Hue | Saturation | Lightness | Hue | Saturation | Lightness |
| Manual Dip Process Slide #1 | 178.63 | 79.75 | 42.18 | 169.11 | 84.02 | 37.88 |
| Manual Dip Process Slide #2 | 267.14 | 81.59 | 36.34 | 197.22 | 82.97 | 31.63 |
| Manual Dip Process Slide #3 | 306.96 | 78.50 | 40.52 | 199.25 | 83.25 | 37.14 |
| AVG | 250.91 | 79.95 | 39.68 | 188.53 | 83.41 | 35.55 |
| STD | 65.69 | 1.55 | 3.01 | 16.85 | 0.55 | 3.42 |
| Automated Process Slide #1 | 251.14 | 79.46 | 33.13 | 198.43 | 81.44 | 32.72 |
| Automated Process Slide #2 | 267.29 | 78.49 | 38.03 | 180.46 | 83.41 | 38.81 |
| Automated Process Slide #3 | 222.16 | 79.58 | 34.63 | 193.11 | 81.89 | 36.93 |
| AVG | 246.87 | 79.17 | 35.27 | 190.67 | 82.25 | 36.15 |
| STD | 22.87 | 0.60 | 2.51 | 9.23 | 1.03 | 3.12 |

Para. A. An apparatus for staining samples comprising, a staining chamber configured to receive at least one staining substrate, wherein the staining chamber and the staining substrate create a closed and defined staining reservoir when placed in contact, the staining reservoir comprising a first port for introducing a fluid into the staining reservoir and/or for removing the fluid from the staining reservoir, and optionally a second port for removing excess fluid/gas.

Para. B. The apparatus of Para. A, comprising an environmental chamber, configured to produce controlled humidity levels within the staining reservoir.

Para. C. The apparatus of any one of Para. A-B, comprising a plurality of reagent vessels containing liquid reagents configured to be in fluid communication with the inlet port and the staining reservoir by a tubular line;

Para. D. The apparatus of any one of Para. A-C, comprising a waste vessel configured to be in fluid communication with the outlet port and the staining reservoir by a tubular line.

Para. E. The apparatus of any one of Para. A-D, comprising a controller electrically connected to the apparatus and configured to permit execution of a programmed staining protocol.

Para. F. The apparatus of any one of Para. A-E, comprising at least one pump communicatively coupled to the controller, wherein the at least one pump is configured to transport fluid through the apparatus.

Para. G. The apparatus of any one of Para. A-F, wherein the staining chamber is a slide staining chamber.

Para. H. The apparatus of any one of Para. A-G, wherein the staining substrate is a cytological slide.

Para. I. The apparatus of any one of Para. A-H, wherein the environmental chamber has a heating element.

Para. J. The apparatus of any one of Para. A-I, comprising wherein the environmental chamber is configured to be in communication with pumps and valves in series with the slide chamber.

Para. K. The apparatus of any one of Para. A-J, wherein the environmental chamber is configured to generate conditions greater than about 45% relative humidity within the staining reservoir.

Para. L. The apparatus of any one of Para. A-K, wherein a depressurizer configured to be in communication with the waste vessel by a tubular line.

Para. M. The apparatus of any one of Para. A-L, wherein a pressurizer is configured to be in communication with at least one of the plurality of vessels by a tubular line.

Para. N. The apparatus of any one of Para. A-M, wherein each of the plurality of vessels incorporates a gas-inlet, gas-outlet, a liquid-outlet, and any combination thereof.

Para. O. The apparatus of any one of Para. A-N, wherein the gas inlet of each subsequent vessel is connect to the gas-outlet of the previous vessel, except for the last vessel in which the gas-outlet is sealed.

Para. U. The apparatus of any one of Para. A-O, wherein the liquid-outlet of a reagent vessel is connected to a liquid manifold.

Para. V. The apparatus of any one of Para. A-U, wherein the liquid-outlet of a reagent vessel is connected to a fluid pump inlet.

Para. W. The apparatus of any one of Para. A-V, wherein fluid pump outlet is connected to a manifold.

Para. X. The apparatus of any one of Para. A-W, wherein the liquid manifold incorporates an inlet for the liquid from each of the plurality of vessels, a mixture chamber wherein the liquids traversing the manifold may be mixed, and a liquid outlet from which the mixed liquid may exit the liquid-manifold.

Para. Y. The apparatus of any one of Para. A-X, comprising a seal configured to provide a gas-tight and water-tight seal between the staining substrate and the staining chamber.

Para. Z. The apparatus of any one of Para. A-Y, wherein a top surface of the staining chamber and/or staining reservoir comprises a liquid inlet and a liquid-outlet.

Para. AA. The apparatus of any one of Para. A-Z, wherein the liquid inlet of the staining chamber is connected to the liquid-outlet of a liquid-manifold and the liquid outlet of the staining chamber is connected to the liquid inlet of a waste vessel.

Para. AB. The apparatus of any one of Para. A-AA, wherein the waste vessel comprises a liquid inlet and a gas outlet.

Para. AC. The apparatus of any one of Para. A-AB, wherein a gas inlet of one of the plurality of vessels is configured to apply positive pressure to the plurality of reagent vessels.

Para. AD. The apparatus of any one of Para. A-AC, wherein a gas outlet of the waste vessel is configured to apply negative pressure to the waste vessel.

Para. AE. The apparatus of any one of Para. A-AD, wherein a combination of negative pressure at the waste vessel gas exit and positive pressure at the first liquid vessel gas inlet promotes the flow of liquid from the vessels, through the liquid manifold, through the staining chamber, and into the waste vessel.

Para. AF. The apparatus of any one of Para. A-AE, wherein the at least one pump is configured to modulate flow of liquid from each of the plurality of reagent vessels.

Para. AG. The apparatus of any one of Para. A-AF, comprising a liquid valve configured to modulate flow of liquid from a liquid manifold into the staining chamber.

Para. AH. The apparatus of any one of Para. A-AG, comprising a liquid valve configured to modulate flow of liquid from the staining chamber to the waste chamber.

Para. AI. The apparatus of any one of Para. A-AH, wherein flow rate of liquid from each of the plurality of vessels may be modulated by adjusting the magnitude of positive pressure applied to the gas inlet of a first of the plurality of reagent vessels.

Para. AJ. The apparatus of any one of Para. A-AI, wherein flow rate of liquid from the staining chamber to the waste vessel may be modulated by adjusting the magnitude of negative pressure applied to the gas outlet of the waste vessel.

Para. AK. The apparatus of any one of Para. A-AJ, comprising sensors configured to monitor flow rate, volume, pressure, or combinations thereof.

Para. AL. The apparatus of any one of Para. A-AK, comprising the flow rate and/or volume may be monitored with valves configured to distribute fluid at given intervals/pulses.

Para. AM. The apparatus of any one of Para. A-AL, wherein the pressurizer is selected from the group consisting of a compressed gas canister, a compressed gas line, and an electromechanical gas compressor.

Para. AN. The apparatus of any one of Para. A-AM, wherein the staining chamber is configured to receive at plurality of staining substrates, wherein the staining chamber and each of the plurality of staining substrates create separate closed and defined staining reservoirs when placed in contact.

Para. AO. The apparatus of any one of Para. A-AN, wherein the slide chamber is configured to receive at plurality of cytological slide substrates, wherein the slide chamber and each of the plurality of cytological slide substrates create separate closed and defined staining reservoirs when placed in contact.

Para. AU. The apparatus of any one of Para. A-AO, wherein flow or volume of a liquid and/or a gas is controllable with at least one manifold configured to distribute fluid and/or gas between multiple slide chambers.

Para. AV. The apparatus of any one of Para. A-AU, comprising a vacuum line configured to evacuate liquid or gas to the waste vessel.

Para. AW. The apparatus of any one of Para. A-AV, wherein the liquid valves are electromechanical.

Para. AX. The apparatus of any one of Para. A-AW, wherein the liquid valves are configured to be in communication with mechanical switches requiring user interaction to modulate the valve state or configured to be in communication with the controller, wherein the controller is configured to provide programmatic control of valve state.

Para. AY. The apparatus of any one of Para. A-AX, wherein the pressurizer is comprises a gas valve configured to modulate the magnitude of applied pressure.

Para. AZ. The apparatus of any one of Para. A-AY, wherein the gas valve is configured to be adjusted mechanically through user interaction or electronically with a microcontroller.

Para. AB. The apparatus any one of Para. A-AZ, wherein the vacuum line or electromechanical gas vacuum comprises a vacuum valve.

Para. BB. The apparatus any one of Para. A-AB, wherein the vacuum valve is configured to modulated the magnitude of applied pressure Para. BC. The apparatus of any one of Para. A-BB, wherein the vacuum valve is configured to be adjusted mechanically through user interaction or electronically with a microcontroller.

Para. BD. The apparatus of any one of Para. A-BC, comprising pressure sensors in communication with the pressurizer or the vacuum configured to ensure sufficient gas pressure and vacuum pressure is being applied to the apparatus.

Para. BE. The apparatus of any one of Para. A-BD, comprising fluid flow sensors in communication with a tubular line configured to ensure sufficient fluid flow occurs throughout the apparatus.

Para. BF. The apparatus of any one of Para. A-BE, comprising a fluid level sensor in communication with the slide chamber configured to ensure a sufficient quantity of liquid is applied to the staining sample for a sufficient duration of time.

Para. BG. The apparatus of any one of Para. A-BF, comprising a fluid level sensor in communication with at least one of the plurality of reagent vessels configured to ensure the reagent vessel contains a sufficient quantity of liquid.

Para. BH. The apparatus of any one of Para. A-BG, comprising a fluid level sensor in communication with the waste vessel configured to ensure capacity for the waste vessel is not exceeded.

Para. BI. The apparatus of any one of Para. A-BH, wherein manifold liquid inlets are provided in parallel connection to a vacuum source that is enabled when the corresponding liquid-valve for the corresponding liquid-inlet is disabled to ensure no unintentional flow of liquid into the liquid manifold occurs.

Para. BJ. The apparatus of any one of Para. A-BI, wherein a liquid manifold incorporates multiple a plurality of outlets, each outlet connected to a distinct slide chamber, where the channel may incorporate a valve to modulate the flow of liquid to the sample chamber.

Para. BK. The apparatus of any one of Para. A-BJ, wherein the controller is configured to provide automated control of a gas source, a vacuum source, gas valves, vacuum valves, liquid-channel valves, liquid pumps, sensors, or any combination thereof to provide automated application of liquid to the staining reservoir.

Para. BL. The apparatus of any one of Para. A-BK, comprising a user interface configured to indicate to a user the state of components of the apparatus, and/or the progress of an automated application of liquids to the staining reservoir.

Para. BM. The apparatus of any one of Para. A-BL, wherein the user interface provides the user the capability to adjust the routine by which liquids are automatically applied to a sample substrate.

Para. BN. The apparatus of any one of Para. A-BM, comprising a motor configured to open and close the staining chamber.

Para. BO. The apparatus of any one of Para. A-BN, comprising a substrate loader.

Para. BU. The apparatus of any one of Para. A-BO, wherein the substrate loader is configured to hold more than one slide.

Para. BV. The apparatus of any one of Para. A-BU, wherein the substrate loader is controlled by a motorized motion component to move a substrate from one location to the staining chamber.

Para. BW. The apparatus of any one of Para. A-BV, wherein the substrate loader is controlled by a motorized motion component to move the substrate from the substrate loader to the chamber.

Para. BX. The apparatus of any one of Para. A-BW, comprising a heating element.

Para. BY. The apparatus of any one of Para. A-BX, wherein the heating element is configured on any surface of staining chamber to heat the staining substrate.

Para. BZ. The apparatus of any one of Para. A-BY, wherein the heating element is housed inside the staining chamber.

Para. AB. The apparatus of any one of Para. A-BZ, comprising an imaging system.

Para. BB. The apparatus of any one of Para. A-AB, wherein the imaging system is configured to image the staining substrate.

Para. BC. The apparatus of any one of Para. A-BB, wherein the imaging system is configured to obtain a representative image, diagnostic data, and/or morphological information from material on a slide.

Para. BD. The apparatus of any one of Para. A-BC, wherein the staining chamber is comprised of at least one self-adjusting pressure plate.

Para. BE. The apparatus of any one of Para. A-BD, wherein the at least one pressure plate is adjusted with a combination of screws and springs.

Para. BF. The apparatus of any one of Para. A-BE, wherein the at least one pressure plate has a sealing mechanism that creates a seal with the slide when closed.

Para. BG. The apparatus of any one of Para. A-BF, wherein the pressure plate has a heating element to vary the temperature of the slide.

Para. BH. The apparatus of any one of Para. A-BG, wherein the pressure plate is interchangeable for various staining substrates Para. BI. The apparatus of any one of Para. A-BH, wherein the staining chamber is configured to deliver gas at about a 90 degree angle to the staining reservoir, staining substrate, and/or cytological slide.

Para. BJ. A method of preparing a sample for imaging comprising staining a sample deposited on a staining substrate in an apparatus comprising a staining chamber configured to receive the staining substrate, wherein the slide chamber and the cytological slide create a closed and defined staining reservoir; and controlling humidity levels within the staining reservoir for at least a portion of the staining.

Para. BK. The method of Para. BJ, wherein the staining chamber is a slide staining chamber and/or the staining substrate is a cytological slide, or both.

Para. BL. The method of any one of Para. BJ-BK, wherein the humidity levels are controlled at about 20%, about 30%, about 40%, about 50%, about 60%, about 70%, about 80%, about 90%, or about 100% relative humidity for at least a portion of the staining.

Para. BM. The method of any one of Para. BJ-BL, wherein the humidity levels are controlled at greater than about 45% relative humidity for at least a portion of the staining.

Para. BN. The method of any one of Para. BJ-BM, wherein gas is delivered at about a 90 degree to the staining reservoir and/or staining substrate to control the humidity levels.

Para. BO. The method of any one of Para. BJ-BN, wherein the imaging is high magnification imaging.

Para. BU. The method of any one of Para. BJ-BO, wherein imaging is compound microscopy, confocal microscopy, scanning electron microscopy, transmission electron microscopy, Fresnel incoherent correlation holography (FINCH) microscopy, or partial wave spectroscopic (PWS) microscopy.

We claim:

1. An apparatus for staining samples comprising:
   a. a staining chamber configured to receive at least one staining substrate, wherein the staining chamber and the staining substrate create a closed and defined staining reservoir when placed in contact, the staining reservoir comprising a first port for introducing a fluid into the staining reservoir and/or for removing the fluid from the staining reservoir, and a second port for removing excess fluid/gas;
   b. an environmental chamber configured to produce controlled humidity levels within the staining reservoir, wherein the environmental chamber comprises a humidity sensor to measure the humidity levels;
   c. a plurality of reagent vessels containing liquid reagents configured to be in fluid communication with the first port and the staining reservoir by a tubular line, wherein a flow of the liquid reagents is measured using an infrared flow sensor and controlled using feedback from a pressure sensor;

d. a waste vessel configured to be in fluid communication with the second port and the staining reservoir by a tubular line;

e. a controller electrically connected to the apparatus and configured to permit execution of a programmed staining protocol; and f. at least one pump communicatively coupled to the controller, wherein the at least one pump is configured to transport fluid through the apparatus.

2. The apparatus of claim 1, wherein the staining substrate is a cytological slide.

3. The apparatus of claim 1, wherein the environmental chamber has a heating element.

4. The apparatus of claim 1, wherein the environmental chamber is configured to be in communication with pumps and valves in series with a slide chamber.

5. The apparatus of claim 1, wherein the environmental chamber is configured to generate conditions greater than about 45% relative humidity within the staining reservoir.

6. The apparatus of claim 2, further comprising a seal configured to provide a gas-tight and water-tight seal between the cytological slide and a slide chamber.

7. The apparatus of claim 1, wherein the staining chamber is configured to receive at plurality of staining substrates, wherein the staining chamber and each of the plurality of staining substrates create separate closed and defined staining reservoirs when placed in contact.

8. The apparatus of claim 1, wherein a slide chamber is configured to receive a plurality of cytological slide substrates, wherein the slide chamber and each of the plurality of cytological slide substrates create separate closed and defined staining reservoirs when placed in contact.

9. The apparatus of claim 1, wherein the controller is configured to provide automated control of a gas source, a vacuum source, gas valves, vacuum valves, liquid-channel valves, liquid pumps, sensors, or any combination thereof to provide automated application of liquid to the staining reservoir.

10. The apparatus of claim 1, further comprising:
a heating element configured to increase an amount of vapor in the environmental chamber.

11. The apparatus of claim 1, further comprising:
an imaging system configured to image the staining substrate.

12. The apparatus of claim 1, wherein the staining chamber comprises at least one adjustable pressure plate.

13. An apparatus for staining slides comprising, a. a staining chamber configured to receive at least one staining substrate, wherein the staining chamber and the staining substrate create a closed and defined staining reservoir when placed in contact, the staining reservoir comprising a first port for introducing a fluid into the staining reservoir and/or for removing the fluid from the staining reservoir, and optionally a second port for removing excess fluid/gas, and wherein a flow of the fluid is measured using an infrared flow sensor and controlled using feedback from a pressure sensor; and b. an environmental chamber configured to produce controlled humidity levels within the staining reservoir, wherein the environmental chamber comprises a humidity sensor to measure the humidity levels.

14. The apparatus of claim 13, wherein the staining chamber is a slide staining chamber and/or the staining substrate is a cytological slide.

15. The apparatus of claim 14, wherein the environmental chamber has a heating element.

16. The apparatus of claim 14, wherein the environmental chamber is configured to generate conditions greater than 45% relative humidity within the staining reservoir.

17. The apparatus of claim 13, wherein the staining chamber is configured to deliver gas at about a 90 degree angle to the staining reservoir and/or the staining substrate.

* * * * *